United States Patent
Gencer et al.

(10) Patent No.: US 10,689,277 B1
(45) Date of Patent: Jun. 23, 2020

(54) APPARATUS FOR THE BIO-REMEDIATION OF A WASTE WATER COMPOSITION

(71) Applicant: IMET CORPORATION, Cleveland, OH (US)

(72) Inventors: Mehmet A. Gencer, Brecksville, OH (US); Kaan Gencer, Brecksville, OH (US); Clark B. Langmack, Gates Mills, OH (US); Paul M. Zakriski, Broadview Heights, OH (US)

(73) Assignee: IMET CORPORATION, Cleveland, OH (US)

( * ) Notice: Subject to any disclaimer, the term of this patent is extended or adjusted under 35 U.S.C. 154(b) by 0 days.

(21) Appl. No.: 16/219,096

(22) Filed: Dec. 13, 2018

(51) Int. Cl.
| | |
|---|---|
| *C02F 3/10* | (2006.01) |
| *C02F 3/20* | (2006.01) |
| *C02F 3/34* | (2006.01) |
| *C02F 3/12* | (2006.01) |
| *C02F 3/26* | (2006.01) |

(52) U.S. Cl.
CPC .............. *C02F 3/106* (2013.01); *C02F 3/107* (2013.01); *C02F 3/108* (2013.01); *C02F 3/121* (2013.01); *C02F 3/201* (2013.01); *C02F 3/26* (2013.01); *C02F 3/341* (2013.01); *C02F 3/347* (2013.01); *C02F 2203/006* (2013.01)

(58) Field of Classification Search
CPC .. C02F 3/106; C02F 3/26; C02F 3/108; C02F 3/201; C02F 3/341; C02F 3/107; C02F 3/121; C02F 3/347; C02F 2203/006
USPC .... 210/150, 151, 615, 616, 617, 620, 221.1, 210/221.2
See application file for complete search history.

(56) References Cited

U.S. PATENT DOCUMENTS

| | | |
|---|---|---|
| 4,810,385 A | 3/1989 | Hater et al. |
| 4,859,594 A | 8/1989 | Portier |
| 4,882,066 A | 11/1989 | Portier |
| 5,021,088 A | 6/1991 | Portier |
| 5,211,848 A | 5/1993 | Friday et al. |
| 5,240,598 A | 8/1993 | Portier et al. |
| 5,403,487 A | 4/1995 | Lodaya et al. |

(Continued)

FOREIGN PATENT DOCUMENTS

| | | |
|---|---|---|
| DE | 10 2004 055 151 A1 | 5/2006 |
| JP | 2000-317485 A | 11/2000 |
| JP | 2005-152704 A | 6/2005 |

OTHER PUBLICATIONS

Wojnowska-Baryla, I., et al., The Biodegradation of Brewery Wastes in a Two-Stage Immobilized System, Polish Journal of Environmental Studies, vol. 11, No. 5, 2002, pp. 571-575, Olsztyn, Poland.

(Continued)

*Primary Examiner* — Fred Prince
(74) *Attorney, Agent, or Firm* — Hudak, Shunk & Farine Co. LPA

(57) ABSTRACT

One or more new, or existing, or modified, open bottom bio-remediation reactors R are contained within a commercial, industrial, or municipal waste water aeration treatment facility or tank directly above existing and/or new stand-alone diffusers located on the bottom of the facility or tank. The reactors R increase solubility of air and/or oxygen in water, increase energy efficiency, increase through put of treated waste water, and improve bio-remediation of the waste water. Also, a tube reactor having no packing substrates in a non-tube area is described.

37 Claims, 27 Drawing Sheets

(56) References Cited

U.S. PATENT DOCUMENTS

| | | | |
|---|---|---|---|
| 5,534,143 | A | 7/1996 | Portier et al. |
| 5,569,634 | A | 10/1996 | Miller et al. |
| 5,609,754 | A * | 3/1997 | Stuth ................ C02F 3/288 |
| | | | 210/151 |
| 5,747,311 | A | 5/1998 | Jewell |
| 5,911,877 | A * | 6/1999 | Perez ................ C02F 3/343 |
| | | | 210/150 |
| 5,997,735 | A * | 12/1999 | Gorton ................ C02F 3/04 |
| | | | 210/151 |
| 8,372,285 | B2 | 2/2013 | Gencer et al. |
| 9,162,909 | B2 | 10/2015 | Gencer et al. |
| 2005/0098497 | A1 * | 5/2005 | Khudenko ........ B01D 19/0031 |
| | | | 210/620 |
| 2006/0180546 | A1 * | 8/2006 | Stuth, Sr. ............ C02F 3/06 |
| | | | 210/617 |
| 2011/0127215 | A1 * | 6/2011 | Gencer ................ C02F 3/06 |
| | | | 210/617 |
| 2014/0238933 | A1 * | 8/2014 | Gencer ................ C02F 3/109 |
| | | | 210/615 |

OTHER PUBLICATIONS

Wojnowska-Baryla, I., et al., Carbon and Nitrogen Removal by Biomass Immobilized in Ceramic Carriers, Polish Journal of Environmental Studies, vol. 11, No. 5, 2002, pp. 577-584, Olsztyn, Poland.

European Communication, EPO Form 1133, dated Oct. 9, 2019 with European Search Report for corresponding application.

* cited by examiner

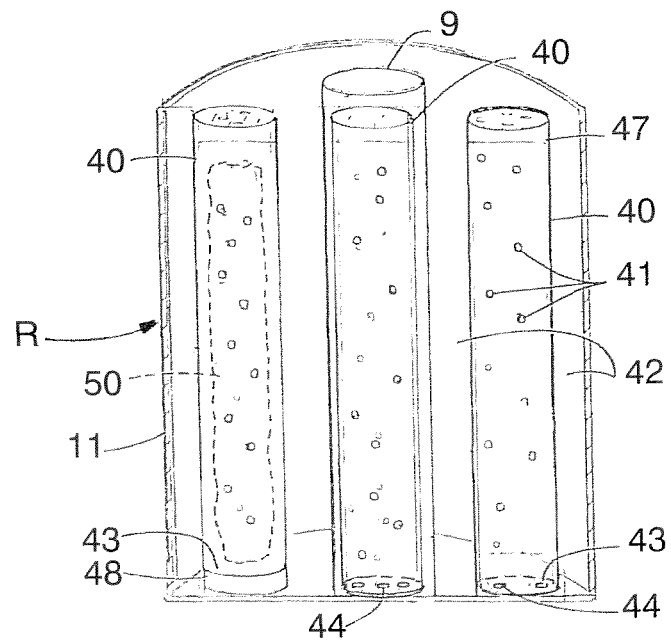
FIG. 22A
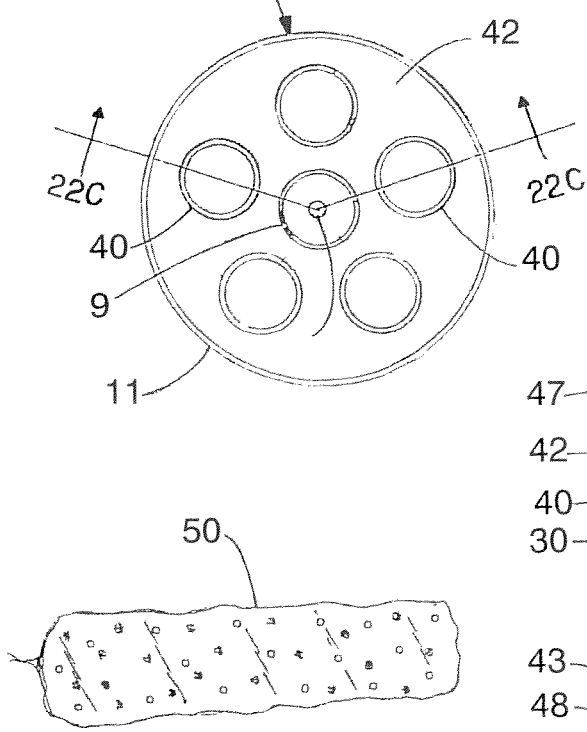
FIG. 22B
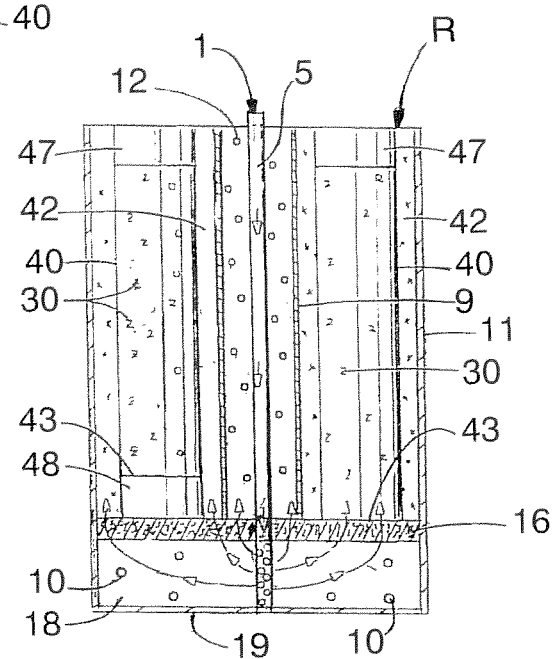
FIG. 22D
FIG. 22C

APPARATUS FOR THE BIO-REMEDIATION OF A WASTE WATER COMPOSITION

FIELD OF THE INVENTION

The present invention relates to a waste water aeration treatment tank that has increased energy efficiency as well as increased through put of the treated waste water, improved bio-remediation, and also increased solubility of oxygen, from air, in the waste water. The apparatus relates to one or more pre-made open bottom, that is existing; or one or more modified, bio-remediation reactors R that can be located in an existing waste water aeration treatment tank.

BACKGROUND OF THE INVENTION

Heretofore, waste treatment systems were generally specialized with regard to the decontamination, immobilization, etc., of specific types of compositions, such as waste water, that generally were not efficient.

U.S. Pat. No. 4,810,385 relates to a device suitable for seeding bacterial cultures to waste flowing through or which has accumulated in a collection system which comprises a porous outer covering member which forms an enclosed package with a source of bacterial cultures contained within said package, said cultures suitable for seeding a collection system as a waste stream flows through the porous covering member of said enclosed package causing the bacteria to be released into said waste stream.

U.S. Pat. No. 4,859,594 relates to a novel microorganisms separated from natural environments and purified and genetically modified, process for immobilizing these microorganisms by affixing then to substrates, the biocatalytic compositions formed by these microorganisms affixed to substrates, and the use of the biocatalytic compositions for the detoxification of toxin-polluted streams. The microorganisms are (1) *Pseudomonas fluorescens* (ATCC SD 904); (2) *Pseudomonas fluorescens* (ATCC SD 903); (3) *Pseudomonas cepacia* (ATCC SD 905); (4) *Methylobacter rhodinum* (ATCC 113-X); and (5) *Methylobacter* species (ATCC 16 138-X).

U.S. Pat. No. 4,882,066 relates to compositions characterized as porous solids on the surfaces of which thin films of chitinous material are dispersed, and to a process employing chitin per se, and preferably the chitin coated compositions, supra, as contact masses for the removal of metals contaminants, or halogenated organic compounds, from liquid streams contaminated or polluted with these materials.

U.S. Pat. No. 5,021,088 relates to a process for the separation and recovery from an ore of a metal, or metals, particularly strategic and precious metals, notably gold. A carbon-containing, gold-bearing ore, notably a carbonaceous or carbonaceous pyritic ore, is contacted and microbially pretreated and leached with a heterotrophic microorganism, or admixture of microorganisms, at heterotrophic conditions to cultivate and grow and said microorganism, or microorganisms, and reduce the carbon content of the ore by consumption of the carbon. The ore, as a result of the heterotrophic pretreatment is subsequently more advantageously colonized by an autotrophic microorganism, or microorganisms, at autotrophic conditions, or hydrometallurgically treated, or both, to facilitate, enhance and increase the amount of gold recovered vis-a-vis a process wherein the gold is recovered (1) by hydrometallurgical processing alone at otherwise similar conditions, or (2), in treating a pyritic ore, by the combination of the autotrophic/hydrometallurgical processing, at otherwise similar conditions.

U.S. Pat. No. 5,211,848 relates to a continuous flow, immobilized cell reactor, and bioprocess, for the detoxification and degradation of volatile toxic organic compounds. The reactor is closed, and provided with biocatalysts constituted of specific adapted microbial strains immobilized and attached to an inert porous packing, or carrier. A contaminated groundwater, industrial or municipal waste, which is to be treated, is diluted sufficiently to achieve biologically acceptable toxicant concentrations, nutrients are added, and the pH and temperature are adjusted. The contaminated liquid is introduced as an influent to the closed reactor which is partitioned into two sections, or compartments. Air is sparged into the influent to the first compartment to mix with and oxygenate the influent with minimal stripping out of the toxic organic compounds. The second section, or compartment, is packed with the biocatalyst. The oxygenated liquid influent is passed through the second compartment substantially in plug flow, the biocatalyst biodegrading and chemically changing the toxic component, thereby detoxifying the influent. Non-toxic gases, and excess air from the first compartment, if any, are removed through a condenser located in the overhead of the reactor. Liquids are re-condensed back to the aqueous phase via the condenser.

U.S. Pat. No. 5,240,598 relates to a microbubble generator is disclosed for optimizing the rate and amount of oxygen transfer to microbial inocula or biocatalysts in bioreactor systems. The microbubble generator, and an associated immobilized cell reactor, are useful in the detoxification and cleanup of non-volatile polymeric and volatile organic-contaminated aqueous streams. In particular, they are useful in the continuous mineralization and biodegradation of toxic organic compounds, including volatile organic compounds, associated with industrial and municipal effluents, emissions, and ground water and other aqueous discharges. One embodiment of the invention includes a microbubble chamber packed with small inert particles through which a liquid effluent and oxygen or another gas are admitted under pressure, followed by a venturi chamber to further reduce the size of bubbles.

U.S. Pat. No. 5,403,487 relates to the biochemical oxidation of two wastewater feeds, one containing at least ten times more ammonia nitrogen, and the other at least ten times more chlorinated hydrocarbons, than present in a conventional municipal wastewater stream were treated in an aerated packed bed bioreactor inoculated with microorganisms ("cells") especially cultured and acclimated to the task. Arbitrarily shaped pieces of numerous microporous synthetic resinous materials (familiarly referred to as "porous plastics") supposedly provide not only a packing for the bioreactor, but also a peculiar catalytic function not normally associated with a bio-support.

U.S. Pat. No. 5,534,143 relates to a microbubble generator is disclosed for optimizing the rate and amount of oxygen transfer to microbial inocula or biocatalysts in bioreactor systems. The microbubble generator, and an associated immobilized cell reactor, are useful in the detoxification and cleanup of non-volatile polymeric and volatile organic-contaminated aqueous streams. In particular, they are useful in the continuous mineralization and biodegradation of toxic organic compounds, including volatile organic compounds, associated with industrial and municipal effluents, emissions, and ground water and other aqueous discharges. One embodiment of the invention includes a microbubble chamber packed with small inert particles through which a liquid effluent and oxygen or another gas are admitted under pressure, followed by a venturi chamber to further reduce the size of bubbles.

U.S. Pat. No. 5,569,634 relates to porous bodies produced which are suitable for use as supports for catalysts, including living cells, such as bacteria and which are upset resistant to acids and bases. The bodies have a significantly large average pore diameter of about 0.5 to 100 microns, (i.e. 5,000 to 1,000,000 ANG.) and a total pore volume of about 0.1 to 1.5 cc/g with the large pores contributing a pore volume of from about 0.1 to 1.0 cc/g. The bodies are made by preparing a mixture of ultimate particles containing a zeolite and one or more optional ingredients such as inorganic binders, extrusion or forming aids, burnout agents, or a forming liquid, such as water.

U.S. Pat. No. 5,747,311 relates to a method for chemically modifying a reactant using microbes. The method includes providing a particulate material which includes a plastic carrier and microbes attached to the carrier. The particulate material is dispersed in a dispersing fluid and has a specific gravity less than that of the dispersing fluid. When the microbe is anaerobic the particulate material has an operating interfacial surface area of from about 2,000 to about 240,000 square meters per cubic meter of reactor volume. When the microbe is aerobic the particulate material has an operating interfacial surface area of from about 1,000 to about 30,000 square meters per cubic meter of reactor volume. The method further includes establishing a flow of the reactant through the particulate material effective to contact the reactant with the microbes for a time sufficient to chemically modify the reactant.

The article Carbon and Nitrogen Removal by Biomass Immobilized in Ceramic Carriers by I. Wojnowski-Baryla, et al., relates to an experiment conducted in a bioreactor with biomass immobilization in ceramic carriers. The influence of hydraulic retention time (HRT), carrier structure and intrinsic circulation rate on carbon and nitrogen removal from municipal wastewater were investigated. Two types of ceramic carriers were used at HRT 70, 60, 40, 30 min for carrier I, and 70, 60, 30, 15 min for carrier II, and at the circulation rate of 60, 40, and 20 dm.sup.3 $h^{-1}$. The highest nitrogen removal efficiency was achieved in carrier II at 30 min of reaction. The carbon removal efficiency was similar for both carriers. An increase in internal circulation rate from 20 to 60 $dm^3$ $h^{-1}$ enhanced nitrogen removal efficiency from 33.0 to 47.2% and decreased in the production of surplus sludge in carrier II.

The article The Biodegradation of Brewery Wastes in a Two-Stage Immobilized System by I. Wojnowski-Baryla, et al, relates to the investigation in a loop bioreactor, where biomass was immobilized in the ceramic carrier. The influence of the internal circulation rate on the biodegradation efficiency of brewery wastes by immobilized biomass and on production of surplus sludge was examined. The rates of the internal circulation were 12, 38, 50 $dm^3$ $h^{-1}$. The experiments were performed at constant loading rate of the carrier of 17.9 caused enhancement of the removal rate from 0.40 to 0.48 g COD $dm^3$ $h^{-1}$ and limitation of surplus sludge productivity from 0.67 to 0.27 g $g.^{-1}$ COD removed. The biodegradation rate of brewery wastes in a two-stage immobilized system was determined. The hydraulic retention time in this two-stage immobilized system was 6 h, which was enough to get a COD below 150 mg $dm^{-3}$ in the effluent.

U.S. Pat. No. 8,372,285 relates to numerous different types of waste compositions generally in an aqueous environment are bio-remediated under aerobic conditions utilizing highly diverse and multiple microorganisms within a reactor. The process is carried out with the microorganisms attached or bound by a variety of different surface characteristics to packing substrates, located within the reactor, having high surface areas and high porosity in the form of small micropores. Multiple different types of substrates are utilized that include minerals, carbon compounds, polymers and plastics, ceramics, metals, and the like and shapes thereof are utilized that efficiently dissolve air into the water. The reactor desirably has multiple bio-remediation stages therein. The reactor also contains at least one perforated chimney through which air can flow and optimize dissolving oxygen into the aqueous environment of the various bio-remediation stages. The reactor houses maximum biodiversity to bio-remediate waste compositions in various wastewaters encountered from industrial, commercial, municipal and residential sources.

U.S. Pat. No. 9,162,909 relates to a reactor that desirably has multiple tubes therein containing the multiple types of packings and microorganisms and contain at least one perforated chimney through which air can flow and optimize dissolving oxygen into the aqueous environment of the various bio-remediation stages.

SUMMARY OF THE INVENTION

An embodiment of the present invention relates to the bio-remediation of waste water contained in an aeration treatment tank by adding and/or inserting therein an existing open bottom, or a modified, bio-remediation stage reactor R containing packing substrates that have pores therein and contain at least one type of microorganism for eradicating, detoxifying, complexing, or otherwise treating waste water. The stage reactor generally has a chimney but is generally free of any air or oxygen air input supply lines or pipes. Rather, such a reactor utilizes air and/or oxygen supplied by an existing waste water aeration treatment tank. The stage reactor desirably is at least partially free of any bottom plate or bottom side wall, or both. The stage reactor is also desirably free of any air diffuser, free of any waste water inlet pipe, free of recirculation pump or sump pump, or desirably is free of two or more of said items or is free of all said items. The stage reactor does contain a perforated support plate to retain the packing substrates within the reactor, and can have a plurality of support legs or other support structures. Desirably, one or more such reactors can be added to an existing waste water aeration treatment tank and placed directly above diffusers of an aeration tank. That is, diffusers are typically built on the bottom of an existing aeration tank and the stage reactor R is placed above the diffusers.

An apparatus for the bio-remediation of waste water, comprising a bio-remediation reactor having a plurality of bio-remediation stages therein, said stages separated by a perforated separator, said reactor having a bottom separator; said reactor having a plurality of porous packing substrates located in said bio-remediation stages and said substrates having one or more microorganisms attached thereto; at least one perforated chimney pipe located within said reactor; said reactor having an open bottom area located below said bottom separator; and said reactor having no air or oxygen, or both, inlet pipe, said stage reactor having one or more supports; and said reactor capable of being located in a waste water aeration treatment tank containing aerators and waste water therein.

Another embodiment of the present invention relates to an apparatus for the bio-remediation of waste water, comprising a bio-remediation tube reactor having one or more side wall perforated bio-remediation tubes therein, at least one of said perforated bio-remediation tubes, independently, having therein one or more different types of packing substrates, said packing substrates being porous and having micro-pores therein; said bio-remediation tube having a non-tube reactor area, wherein said non-tube reactor area has no packing substrates therein; said tube reactor having multiple types of different microorganisms therein that are attached to said packing substrates; said tube reactor having a bottom separator for maintaining said packing substrates in said reactor; said tube reactor having no chimney pipe; said tube reactor having an open bottom area located below said reactor bottom separator, said reactor having no air or oxygen, or both, inlet pipe, said reactor having one or more supports; and at least one or more of said tube reactors capable of being located in a waste water aeration treatment tank containing waste water therein.

In general, an apparatus for the bio-remediation of waste water, comprises a bio-remediation tube reactor having one or more side wall perforated bio-remediation tubes therein, at least one of said perforated bio-remediation tubes, independently, having therein one or more different types of tube packing substrates, said substrates being porous and having micro-pores therein; said bio-remediation tube reactor having a non-tube reactor area, at least a portion of said non-tube area having one or more different types of non-tube packing substrate therein, said non-tube packing substrates being porous and having micro-pores therein; said tube reactor having multiple types of different microorganisms therein that are attached to said tube packing substrates, and to said non-tube packing substrates; said tube reactor having a bottom separator for maintaining said packing substrates in said reactor; said tube reactor having at least one perforated chimney pipe; said tube reactor having an open bottom area located below said reactor bottom separator, said reactor having no air or oxygen, or both, inlet pipe, said reactor having one or more supports; and at least one or more of said tube reactors capable of being located in a waste water aeration treatment tank containing waste water therein.

Still further, the present invention comprises an apparatus for the bio-remediation of waste water, comprising a bio-remediation tube reactor having one or more side wall perforated bio-remediation tubes therein, at least one of said perforated bio-remediation tubes, independently, having therein one or more different types of packing substrates, said substrates being porous and have micro-pores therein; said bio-remediation tube reactor having one or more non-tube reactor areas, said one or more non-tube areas are at least 70% by volume free of any packing substrates therein; said tube reactor having one or more different microorganisms therein that are attached to said tube packing substrates; said tube reactor having no chimney; said tube reactor having a bottom separator for maintaining said tube packing substrates in said perforated bio-remediation tubes; and said tube reactor having an air and/or oxygen inlet capable of admitting air and/or oxygen to said reactor.

BRIEF DESCRIPTION OF THE DRAWINGS

FIGS. 22A, 22B, 22C, and 22D relate to an embodiment wherein perforated separators such as 15A, 15B, 15C, etc. are not utilized but rather one or more perforated tubes that contain one or more packing substrates on one or more microorganisms. More specifically, FIG. 22A is a perspective side view of only the top portion of the tube reactor shown in FIG. 22C of the present invention having a sock filled packing in one of the tubes; FIG. 22B is a top view of the reactor of the present invention; FIG. 22C is a side elevation and partial cross-section view of the tube reactor of the present invention; and FIG. 22D is a top view of a sock of the present invention;

DETAILED DESCRIPTION OF THE INVENTION

Description of the Stage Reactor

Figure 1:
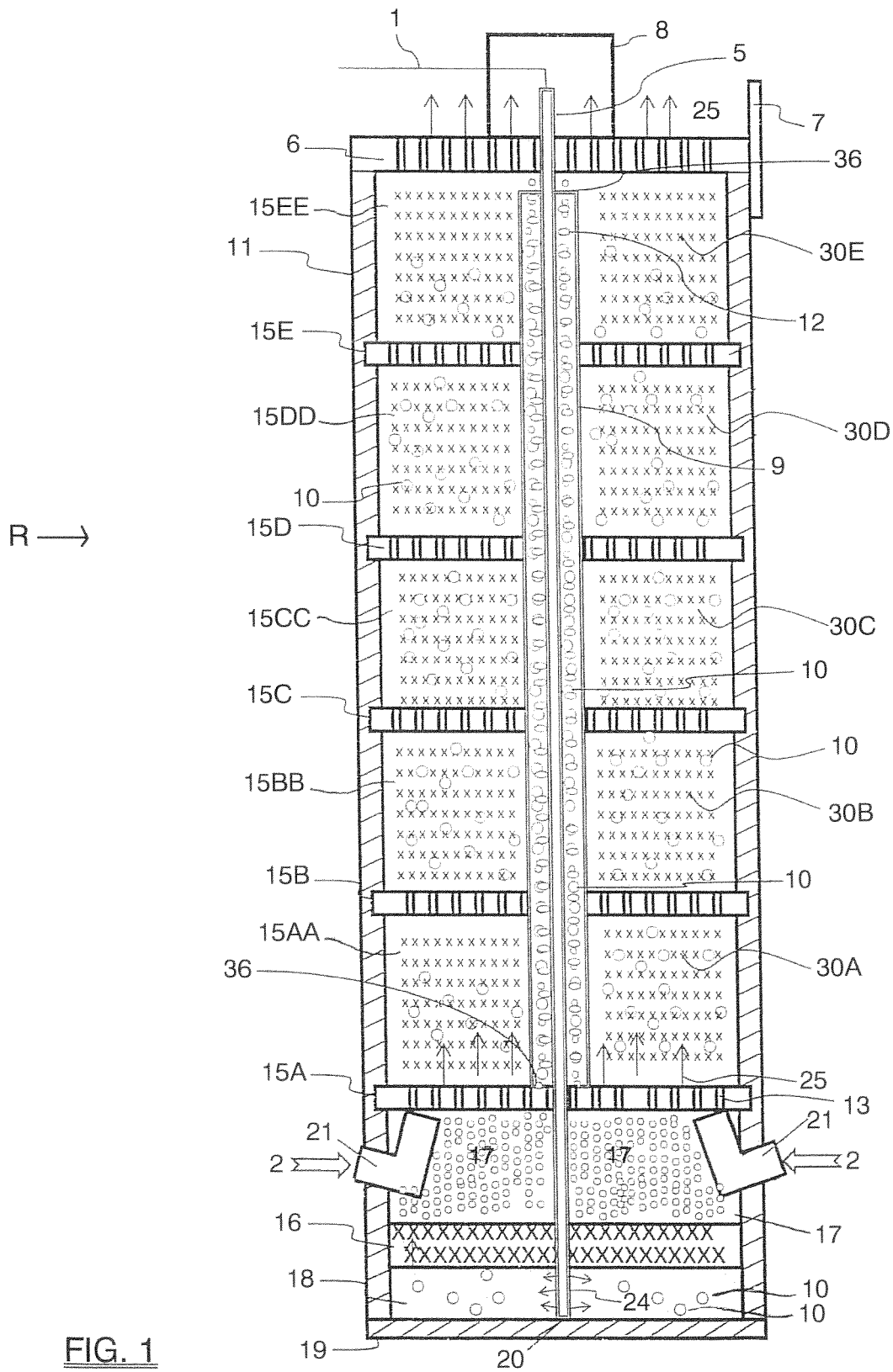
FIG. 1 is a cross-section elevation view of a waste water treatment reactor in accordance with the present invention.

An important aspect of the present invention is the utilization of a stage reactor of the type set forth in U.S. Pat. No. 8,372,285, hereby fully incorporated by reference with regard to all aspects thereof, that is converted to an open bottom stage reactor. This embodiment can be applied to waste compositions that comprise numerous compounds, waste sources and materials that are treatable by aerobic remediation with various microorganisms in an aqueous environment with an oxygen source such as air. Anaerobic remediation is not part of the present invention. Waste water compositions generally include industrial, residential, commercial, sewage, restaurants, and other sources, and the like.

The method and apparatus of the reactor R described herein relates to the present invention eliminates carbonaceous compounds, odors, noxious compounds, toxic compounds, compounds containing ammonia, ammonium, $NO_2$, $NO_3$, $H_2S$, biosludge, natural sources such as algae, and the like. More specifically, examples of industrial waste include hydrocarbons such as hexane, benzene, toluene, xylene, and the like, and alcohols such as ethanol, methanol, phenol, and the like, and nitrogen-containing chemicals such as ammonia, aniline, morphiline, and the like as well as waste from restaurants and food service operations that generally produce large amounts of fats, oils, and grease. Such compounds have and can block sewers, pipelines and the like. Examples of residential waste include dissolved sugar sources, waste food, fats, grease and oil, and the like and dissolved proteins, starches, and of course human excrement. Examples of commercial waste include dissolved sugar sources, waste food, fats, grease and oil and the like and dissolved proteins, starches and the like, as well as excrement from animals, for example, cows, horses, pigs, chickens, and the like. Examples of sewage include waste from any industrial, residential, and commercial sources that are of course piped to a municipal treating plant. Examples of corrosive compounds include sulfur-containing compounds such as $H_2S$ and the like, and carbonate-containing compounds such as lime and soda and the like, nitrate-containing compounds such as vinegar, fertilizer and the like, food sources such as vinegar and the like, and chloride-containing compounds such as table salt and the like.

The microorganisms that are utilized in the bio-remediation of the above wastes generally work through several different mechanisms such as eradication, reaction therewith, formation of complexes, splitting of molecules, formation of new compounds such as carbon dioxide, water, sulfur dioxide, nitrites, nitrates, and nitrogen and the like. As noted above, preferably numerous and different types of microorganisms are utilized in the reactor so that a highly diverse microbial population exists to effectively treat most, and even all of the various types of the waste components found in the aqueous waste composition. Desirably, microorganisms are utilized that are found in nature such as in the soil, trees, ponds, lakes, streams, rivers, grains, plants, mold, spores, fungi, and the like. Microorganisms are generally defined as being cellular and being able to replicate without a host cell. One desired source of microorganisms are the various bacteria that are known to remediate various waste compositions. The different types of bacteria are numerous and known to the art and to the literature and thus include bacteria to biodegrade carbonaceous compounds such as *pseudomonas* species such as *Pseudomonas vesicularis*, *Pseudomonas putida* and *Aeromonas hydrophila*, *Brevibacterium acetylicum*, bacteria to biodegrade nitrogen-containing compounds such as *Nitrobacter* species such as *Nitrobacter winogradskyi* and *Nitrosomonas* species such as *Nitrosomonas europaea* and bacteria to biodegrade sulfur-containing compounds such as *Thiobacillus* species such as *Thiobacillus denitrificans* and the like. Other microorganisms include various fungi such as those that naturally exist in mushrooms, yeasts, and molds. Generally, they lack chlorophyll, have a cell wall composed of polysaccharides, sometimes polypeptides, and chitin, and reproduce either sexually or asexually. Protozoa are simple microorganisms consisting of unicellular organisms that range in size from sub-microscopic to macroscopic. Types of protozoa include sarcomastigophora, labyrinthomorpha, apicomplexa, microspora, acetospora, myxozoa, and ciliophora. Preferably at least two or three, and even four or more different types of microorganism exist within the same bio-remediation stage of the apparatus of the present invention inasmuch as the same has been found to destroy, eradicate, eliminate, react with, the various carbonaceous compounds, various nitrogen containing compounds, various sulfur containing compounds, various toxic compounds, and the like.

In order to be effective, the various microorganisms have to be attached, contained, captured, bound, etc., by various substrates so that they are not washed away by the flow of the aqueous waste composition as it flows through a treating apparatus such as a reactor. In order to yield effective and efficient results, the packing substrates of the present invention have various desirable attributes. An important attribute is a high average surface area such as from at least about 100 square meters per cubic meter ($M^2/M^3$) and desirably at least about 500 $M^2/M^3$ to about 1,000 $M^2/M^3$ and even 200,000 $M^2/M^3$ where $M^2$ is the surface area and $M^3$ is the volume. A more desirable range of the one or more high surface area packing substrates is from about 500 $M^2/M^3$ or 800 $M^2/M^3$ to about 10,000 $M^2/M^3$. At least one, and desirably a plurality of the bio-remediation stages contain two or three, or even four or more different types of packing substrates therein.

Another important attribute is that the substrate be porous and have a large number of pores therein. The average size of the pores are desirably small but sufficiently large enough to house one or more microorganisms including a colony of various microorganisms. The average pore size can vary over a wide range such as from at least about 1 micron to about 150 microns, or up to about 250 microns, and even up to about 500 microns. More desirable pore sizes range from about 4, or about 20, or about 30, or about 50 microns to about 75 microns or about 100 microns. The pores desirably exist not only on the surface of the substrate, but also in the interior thereof and entirely therethrough such that the substrate often has an "open pore structure".

As indicated above, another important attribute is that multiple microorganism, e.g. 2, 3, 4, 5, etc. be applied, attached, fixed, etc., to the packing substrate. Such binding can occur in a number of ways, modes, or surface characteristics such as physically or physico-chemically. Physical attachment can occur by the substrate having a rough surface to help mechanically secure the microorganisms thereto. Physico-chemical attachment can occur through dipolar interaction of the microorganisms to a substrate such as Vanderwalls forces and the like. Physico-chemical attachment can also occur through a cation or an anion microorganism portion respectively with an anionic or a cationic portion of the substrate attachment can also occur through polar or non-polar bonding. Similarly, ionic or non-ionic portions of the microorganism can be attached via ionic or non-ionic bonding. Silica ($SiO_2$) provides anionic surface characteristics while alumina ($Al_2O_3$) provides cationic surface characteristic. Ion exchange resins (cation, anion) can also be used to immobilize a variety of microorganisms utilizing anionic and cationic attractions. Similarly, hydrophobic portions of the microorganism can be attached to hydrophobic portion of the substrate or via a hydrophilic-hydrophilic alignment, etc. While polyethylene and Teflon provide hydrophobic surface characteristics acrylic polymer provides hydrophilic surface characteristics. The above attachment of the microorganisms to the porous substrates is such that the microorganisms are maintained in place throughout the bio-remediation process.

An important aspect of the present invention is that multiple and generally numerous different types of porous substrates are utilized within a single reactor. Substrates generally include minerals, carbon substrates, ceramic, metal substrates, polymers or plastics, and the like. Examples of various minerals include clay, diatomaceous earth, fuller's earth, titanium dioxide, zirconium dioxide, chromium oxide, zinc oxide, magnesia, boria, boron nitride, pumice, lava, including crushed lava, celite, slag, and the like. Examples of carbon substrates include charcoal, coal, pyrolized wood or wood chips, activated carbon and the like. Ceramics are generally silicates, alumina, mullite, and include brick, tile, terra cotta, porcelain, glasses of all types such as sodium glass and boron glass, porcelain enamels, refractories such as alumina, silicone carbide, boron carbide, and the like. Metal substrates include iron, nickel, cobalt, zinc, aluminum, and the like.

Polymers or plastics constitute another class of porous packing substrates and include homopolymers, copolymers, graph copolymers, and the like such as polystyrene or copolymers of styrene and/or alpha-methyl styrene and acrylonitrile, and copolymers of styrene/acrylonitrile (SAN), terpolymers of styrene, acrylonitrile and diene rubber (ABS), copolymers of styrene/acrylonitrile modified with acrylate elastomers (ASA), copolymers of styrene/acrylonitrile modified with ethylene/propylene/diene monomer (EPDM) rubber (ASE), and copolymers of styrene and maleic anhydride (SMA); polyolefins such as polyethylene and polypropylene; chlorinated polyvinyl chlorides (CPVC); polycarbonates (PC); thermoplastic polyesters (TPES) including polybutylene terephthalate (PBT), polyethylene terephthalate (PET), and aromatic polyesters; polyether-ester segmented copolymers, such as Hytrel* by DuPont Corp.; polyurethanes (PUR); miscible blends of polystyrenes and polyphenylene oxides (PPO), commercially available as Norel from General Electric Company; polyacetals (POM); polymers of acrylic acid, methacrylic acid, acrylic esters, and methacrylic esters; polyamide-imides; polyacrylonitriles; polyarylsulfones; polyester-carbonates; polyether-imides; polyether-ketones (PEK); polyether-ether-ketones (PEEK); polyalphaether ketones (PAEK); polyether sulfones; polyphenylene sulfides; polysulfones; nylons; anionic and cationic exchange resins, combinations of any of these polymers as well as recycled mixed plastics and the like.

The pH of the packing substrate can be important and can range from about 4 to about 10 and preferably from about 6.0 to about 8.

In order to achieve efficient and thorough bio-remediation of aqueous waste compositions, it is important that the above-noted aspects of the present invention be incorporated within the reactors. Moreover, it is an additional important aspect that the packing substrates be of a size, shape, and type so that it aids in dissolving a high amount of oxygen into the water such as at least an average of about 1 part by weight, desirably at least about 2 parts by weight, preferably from about 3 to about 8 parts by weight per million parts by weight of waste water.

With respect to the overall reactor design, the individual reactors can have various shapes and forms but desirably are elongated as in the form of a column or tower containing the packing substrate therein with the pores thereof containing multiple types of microorganisms. A variety of microorganisms in liquid form or dry form are obtained from commercial sources as well as natural sources are added either before or immediately after inserting into the treatment area. Microorganisms are also added into wastewater periodically when needed. The waste compositions contained in an aqueous environment are generally added near the bottom of the reactor with air generally being pumped in at the bottom of the reactor. The addition of air under slight pressure will naturally rise through the reactor and encounter the aqueous wastewater composition and cause the same to rise. The air-wastewater composition then encounters various stages of the reactor containing multiple types of packing substrate containing multiple types of microorganisms in the pores thereof. As noted above, since generally higher than 2 parts per million (ppm) of oxygen is necessary for efficient operation of the reactor, packing substrates are chosen that provide good mixing of the air with water and thereby fuse the air into smaller bubbles and dissolve the oxygen which is contained or trapped by the substrates within the water. Thus, substrates are chosen that form a tight packing with one another and have a high packing fraction, i.e. high volume, e.g. overall or exterior volume, of the substrates to the overall interior volume of at least one and preferably all of the bio-remediation stages of the reactor such as at least about 10%, desirably at least about 50%, and preferably about at least 95% by volume. High packing fraction also generally prevents the formation of channels that permit air to channel through the reactor and avoid good mixing. During the course of treatment of the aqueous waste compositions, the dissolved oxygen will aid or react with the microorganisms to eradicate, attack, react, complex, and otherwise transform the waste compositions into odorless, detoxified, non-harmful or desired end products.

Another aspect of the reactors utilized in the present invention is that due to the above-noted parameters, long resident times are generally obtained that permits the microorganisms to bio-remediate or treat the waste compositions in the water. Thus, resident times of from about 2 hours to about 48 hours and generally from about 6 hours to about 24 hours are desired.

Due to the utilization of one or more air input chambers, the utilization of multiple perforated separators or support trays and hence multiple treatment stages, the utilization of one or more aqueous waste composition feed inputs, multiple different types of porous substrates containing multiple types of microorganisms, numerous different types of reactors can be utilized. Accordingly, it is to be understood that the following description of different reactors only refer to a few of the possible many different types of reactors.

Reference is now made to the drawings wherein like names/numerals refer to like parts throughout. Referring to FIG. 1, reactor R can be of any shape having a cross-section thereof that can be square, rectangular, cylindrical, and the like. The reactor contains solid outer walls 11 that are made of a corrosive-free material such as stainless steel and plastics. The reactor generally has a bottom chamber 18 that receives air or oxygen-containing gas under a slight pressure. Air is admitted to the reactor via an air pump, not shown, that supplies air through air supply pipe or conduit 1 and into the top of the reactor through reactor air inlet pipe 5 that is made of a corrosion-resistant material such as stainless steel or plastic. Air inlet pipe 5 is solid except at the bottom portion thereof that has openings or perforations 24 that admits the pressurized air into air pressure chamber 18. Air inlet pipe 5 is connected to reactor bottom plate 19 through connection 20 that can be a mechanical fitting, a weld, or the like. When the air flows into chamber 18 that generally extends throughout the bottom portion of the reactor, since it is under pressure it is forced through micro-porous diffuser 16 that has tiny openings so that the air is admitted into aqueous waste composition chamber 17 in the form of tiny bubbles. Micro-porous diffusers are known to the art and to the literature and are commercially readily available.

Figure 2:
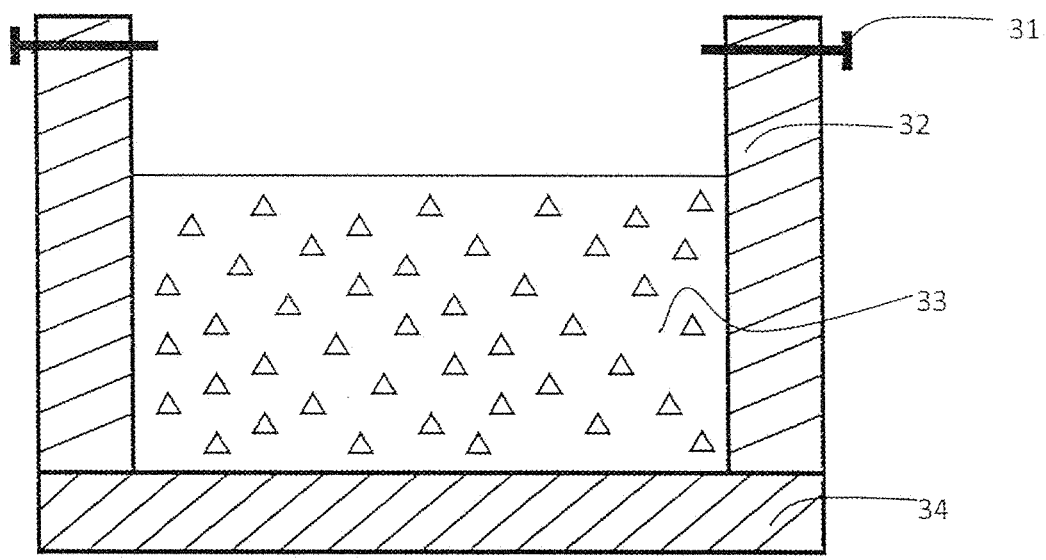
FIG. 2 is a cross-section elevation view of a ballast that can optionally be utilized in association with the reactors of the present invention.

Reactor R, that contains lift handle 8, can be inserted into any aqueous waste composition environment such as a pond, a holding tank, a sewage enclosure or other confined area. Reactor R can be free standing, that is, simply placed within the aqueous waste composition enclosure in which situation ballast can be added to the bottom portion of the reactor. FIG. 2 shows one type of ballast containing a corrosion-resistant bottom 34 have side walls or housing 32 that form an enclosure that contains a ballast material 33 such as concrete therein. The optional ballast can be secured to the bottom of reactor R as through bolts 31 or other fastening members. Alternatively, reactor R can optionally be attached to a support such as the wall of wastewater treatment tank through holding lug 7.

Figure 4:
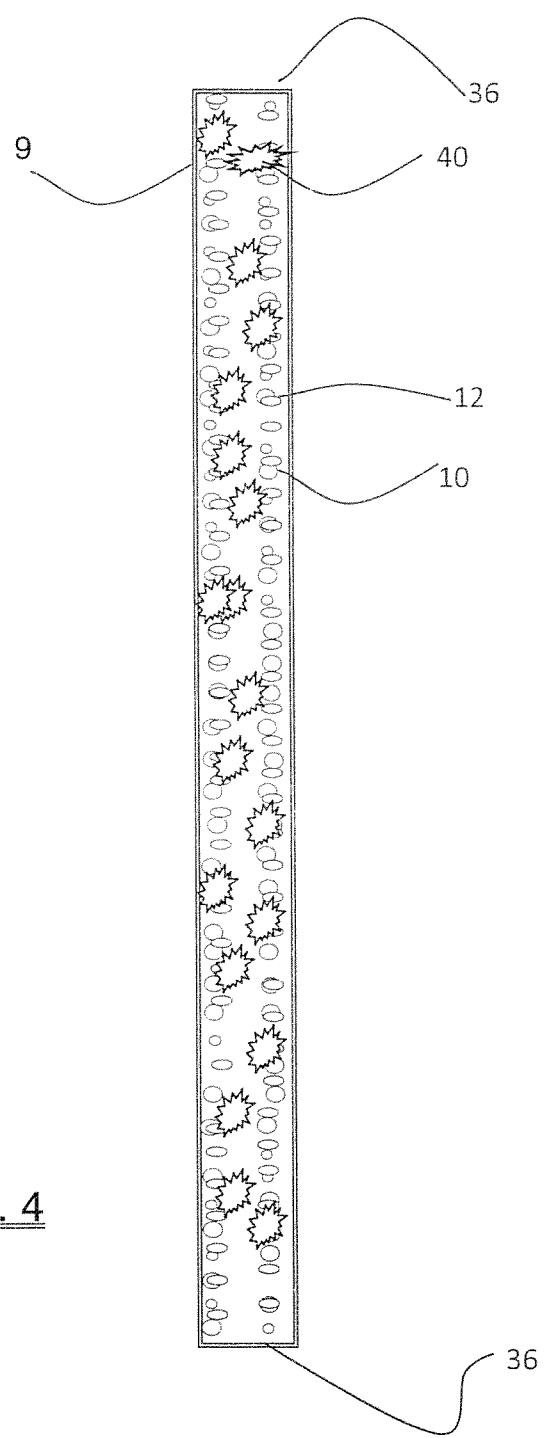
FIG. 4 is an elevation view of a chimney of the reactor of the present invention showing packing therein.

The aqueous waste composition is added to the reactor through wastewater inlet 21 that can be in the shape of an elbow having an opening at the other end thereof and optionally can be perforated. When placed in a tank containing an aqueous waste composition therein, the aqueous waste composition will flow into aqueous waste composition chamber 17 wherein it is mixed with air bubbles 10. The aqueous waste composition will be caused to flow upward through the reactor via drag forces due to forced air flow through the perforated air carrier pipe, chimney 9. That is, the concept of the reactor is a bottom input of air as well as the aqueous waste composition that is then caused to flow upward through various perforated separators 15A, 15B, 15C, etc., that have perforations 13 therein and thus through various stages of the reactor. The size of the various perforated openings in the separators is sufficient to allow air and water to flow therethrough but generally and desirably does not permit the packing substrates to pass therethrough. FIG. 4 shows various substrates with high surface area are placed in perforated, chimney pipe 9 to create tortuous paths for air bubbles improve dissolving oxygen into wastewater.

Perforated separator 15A is a diffuser that allows bubbles 10 of air containing oxygen in aqueous waste composition 17 to flow upward therethrough (flow arrows 25) thus providing an additional mixing of the aqueous waste composition and the air bubbles so that some of the oxygen in the air is dissolved into the water.

As noted above, an important aspect of the present invention is that a plurality of multiple perforated separators exist to create a plurality of bio-remediation stages throughout the reactor such as anywhere from 2 to about 10 and desirably from about 3 to about 5 stages. The area formed between perforated separators 15A, 15B, and 15C, are identified as chamber 15AA, 15BB, 15CC, etc. The chambers 15AA, 15BB, 15CC, etc., are filled with packing substrate 30 that although can be only one type of packing but preferably is a plurality of different packings. That is, while each chamber formed between the various separators may contain only one type of packing, it is highly preferred that a plurality of different types of packings exist within reactor R and that a plurality of different packings also exist within each chamber 15AA, 15BB, 15CC, 15DD, etc.

In accordance with the above-noted aspects of the present invention, chamber 15AA contains packing substrates that are efficient in mixing the air bubbles and water to dissolve the oxygen within the water. Packing substrate 30A in accordance with the aspects of the present invention has high surface area and a high amount of pores having sizes as noted above. Located within packing substrate 30A is at least one type of microorganism with the proviso that the entire reactor R contains a plurality of microorganisms, i.e. at least two and generally several types such as from about 2 to about 300. Numerous microorganisms are utilized so that the reactor is efficient with regard to eradicating, detoxifying, complexing, or otherwise treating the various different types of waste contained with the aqueous waste composition and thus produce a very efficient reactor.

Since bubbles 10 are lighter than the water, they flow upward through chamber 15AA and cause the aqueous waste composition to flow upward so that continuous mixing of the air and the waste composition occurs thereby continuously causing dissolving of some of the oxygen into the water. The upward flow of the aqueous waste composition through the packing substrates 30A causes the dissolved molecular components of the waste composition to eventually contact a microorganism contained within the pores of the substrate whereby the waste composition molecule is bio-remediated. The process of mixing the air bubbles with the aqueous waste stream, the dissolving of oxygen into the water, and the contacting of various molecular components of the waste composition with microorganisms is continuous within each chamber 15AA, chamber 15BB, chamber 15CC, etc. Thus overall, oxygen is dissolved into the water within each chamber and the amount of waste composition from one chamber to the next upper chamber is continuously reduced as the aqueous waste composition proceeds upwardly through the reactor. Because of the tortuous path that must be taken by the waste composition through the various packing beds and the inherent long residence time, the waste composition upon reaching the top of the reactor is essentially depleted of waste components. That is, the aqueous waste composition is purified so that only purified water is admitted from the top of the reactor through perforated top plate 6.

The various perforated separators 15B, 15C, 15D, can be the same or different than perforated separator 15A. Generally, the substrates contained within each chamber 15AA, 15BB, 15CC, can be different so that the various stages, i.e. chambers 15AA, 15BB, 15CC, etc., treat different components of the aqueous waste composition. Of course, the various chambers, inasmuch as they preferably contain multiple different types of packings, can still contain a packing that is similar or identical to that found in another chamber. With respect to the microorganisms, the same situation generally exists within each chamber. That is, while the entire reactor contains at least two different types of microorganisms, generally a plurality exists within each chamber and the different chambers can contain a plurality of different microorganisms that are different from the preceding or following chamber or contain some common microorganisms. In summary, the described reactor R shown in FIG. 1 constitutes a very efficient bio-remediation apparatus and process.

An optional but preferable aspect of the reactor of FIG. 1 is that it contains a chimney pipe 9 that has perforations 12 therein. Chimney pipe 9 can be located generally in the center of the reactor such as adjacent to input air pipe 5. In the embodiment of FIG. 1, there are two chimney pipes 9 located on either side of air pipe 5 with the chimney pipes being perforated 36 at the bottom thereof and also being perforated 36 at the top thereof at perforated top plate 6. Accordingly, air bubbles 10 and the aqueous waste composition can enter the bottom of chimney pipe 9 and flow upward through the pipe. That this upward flow that is not impeded by perforated separators 15A, 15B, 15C, etc., is important to producing continued circulation of the air and aqueous waste composition upward through the various chambers. Moreover, air bubbles within chimney pipe 9 exit therefrom into the various chambers and ensure additional mixing of the air with the aqueous waste composition and more importantly aid in diffusion of dissolved oxygen into the packed chambers of the apparatus from chimneys within the water.

Figure 3:
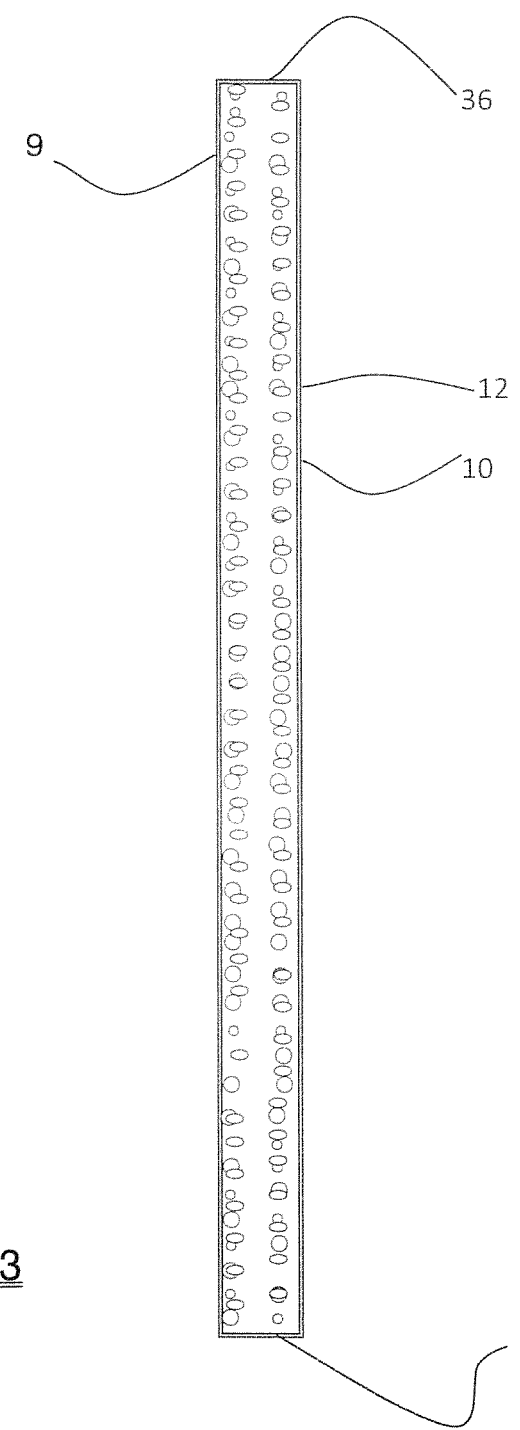
FIG. 3 is an elevation view of a chimney of the reactor of the present invention.
Figure 11:
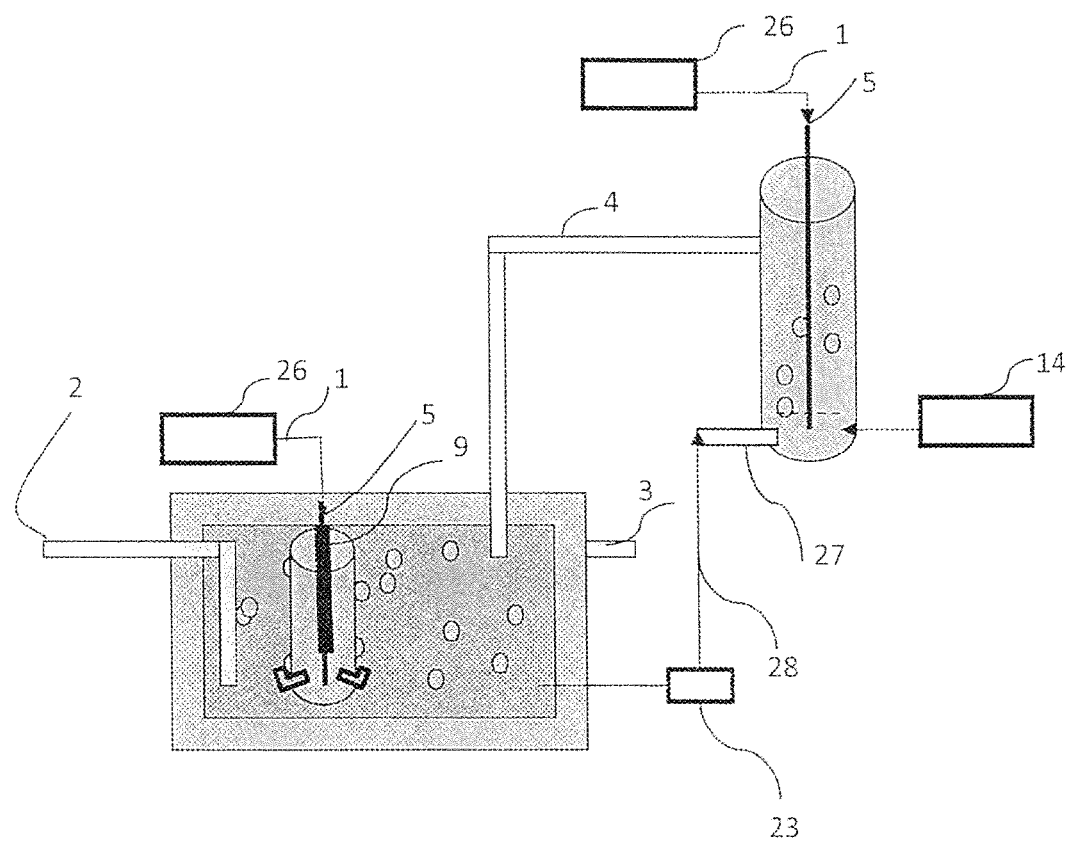

FIGS. 3 and 4 relate to side elevation views of chimney 9. The chimney has a plurality of perforations therein generally indicated by reference numeral 12 as being oval shaped. However, the exact shape of perforations 12 can vary so long as it generally is large enough to permit air bubbles and the aqueous waste composition with dissolved oxygen therethrough but to inhibit the passage of packing substrates 30 therethrough, as shown in FIG. 11. The top and bottom of the chimneys contain perforations 36.

Figure 5:
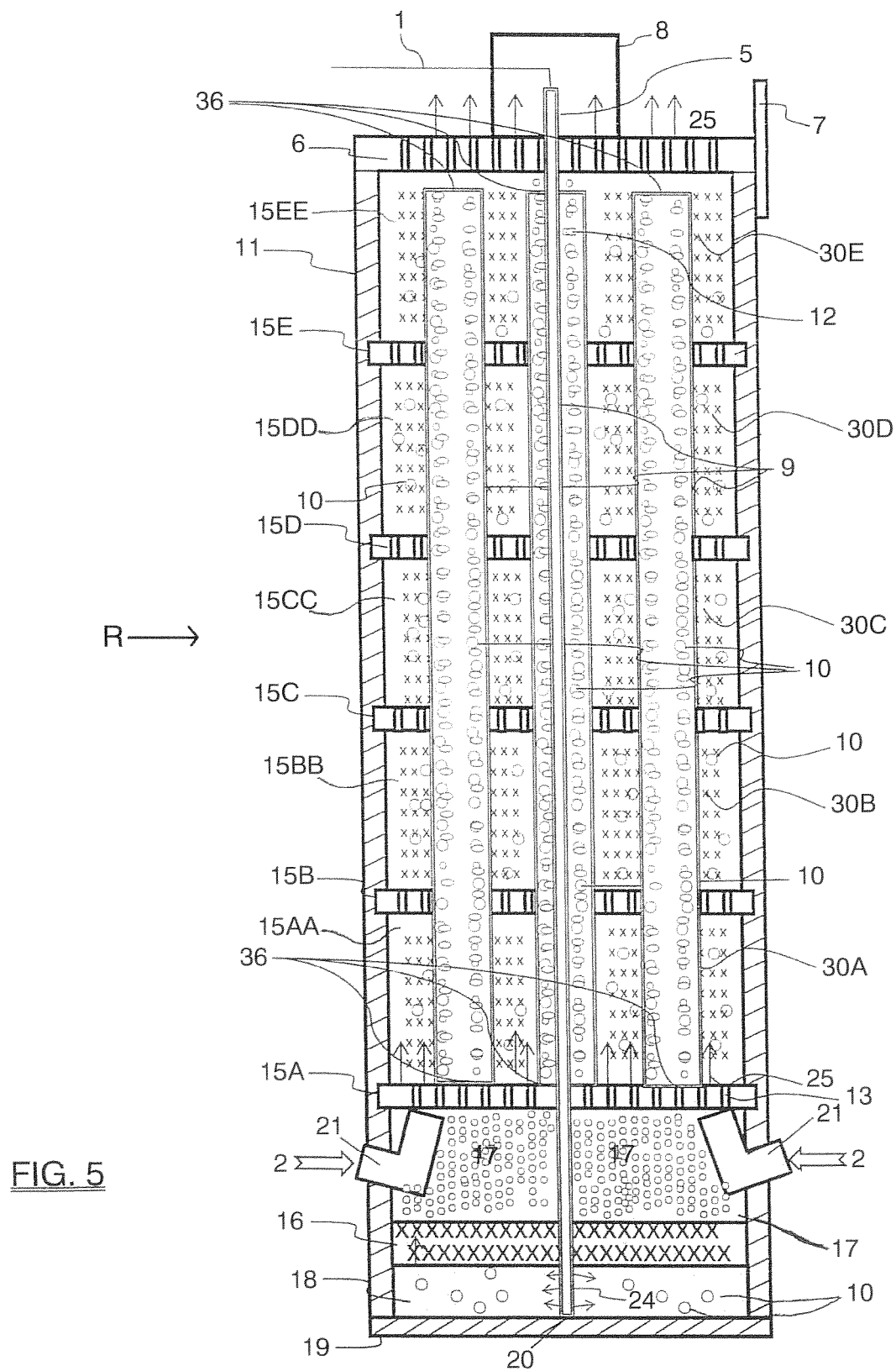
FIG. 5 is a cross-section elevation view of another treatment reactor of the present invention containing additional chimneys therein.

Another reactor of the present invention is shown in FIG. 5 that is very similar to FIG. 1 wherein like numbers represent like parts, and hence the various parts, composition, and process description thereof will not be repeated but rather is hereby fully incorporated by reference.

The reactor of FIG. 5 is different from FIG. 1 in that two additional chimney pipes 9 exist that are located laterally of the center chimney pipe 9. The additional chimney pipes are also perforated at their bottom 36 adjacent to separator 15A and at their top 36 adjacent to perforated top plate 6 so that air and aqueous waste composition can flow therethrough. As with the embodiment of FIG. 1, the additional chimneys serve to circulate air and aqueous wastewater throughout the various chambers 15AA, 15BB, 15CC, etc., to ensure further mixing of the air and water within the chambers and also to promote dissolving oxygen within the water, contact of the waste components with microorganisms, and the like.

Figure 6:
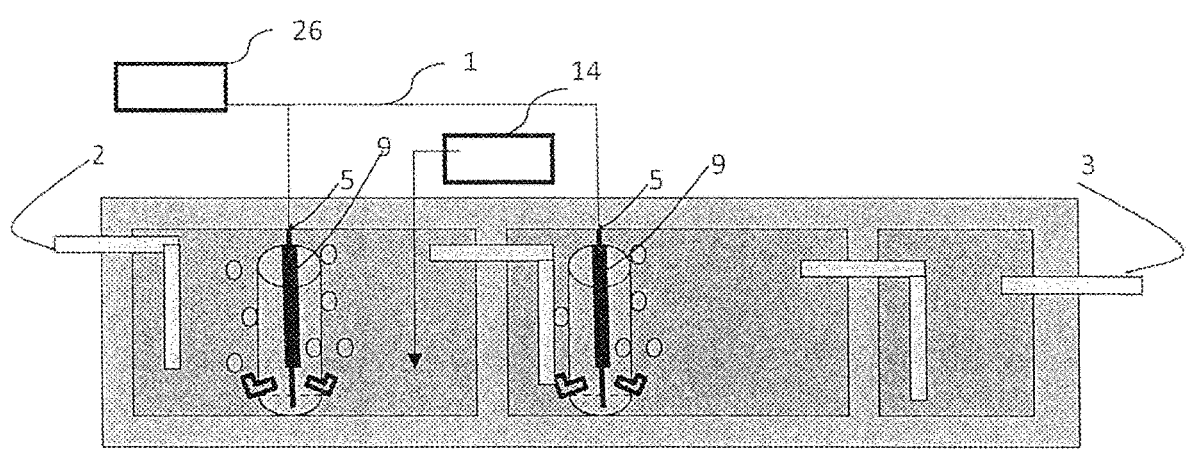
FIG. 6 is a cross-section elevation view containing reactors within a tank.

The embodiment of FIG. 6 relates to use of two reactors each contained within a separate tank to treat aqueous waste compositions therein whereby the aqueous composition of the left tank overflows into the composition of the center tank which then overflows into the right-hand tank and then out wastewater output line 3. More specifically, air pump 26 via air supply line 1 supplies air into the reactor of the left-hand tank as well as to the reactor of the center tank. The two tanks, independently, can be the same as the tanks described in FIG. 1 and FIG. 5. The operation of each separate tank is as set forth hereinabove with regard to FIGS. 1 and 5 and thus will not described for purposes of brevity but rather the above description thereof is fully incorporated by reference. Accordingly, each tank, independently, treats the aqueous waste composition within the tank and emits purified wastewater out of the top of the tank. Slowly the effluent within the left-hand tank is cleaned and through an overflow pipe, is transferred to the center tank. Inasmuch as untreated aqueous waste composition is added through input pipe 2 to the left-hand tank, equilibrium is eventually reached. The effluent from the left tank that flows into the center tank is treated by the reactor in that tank and once again equilibrium is reached wherein the wastewater of the center tank has been bio-remediated such that the effluent thereof is relatively pure. The effluent from the center tank is then overflowed into the right-hand tank where it can be discharged.

Figure 7:
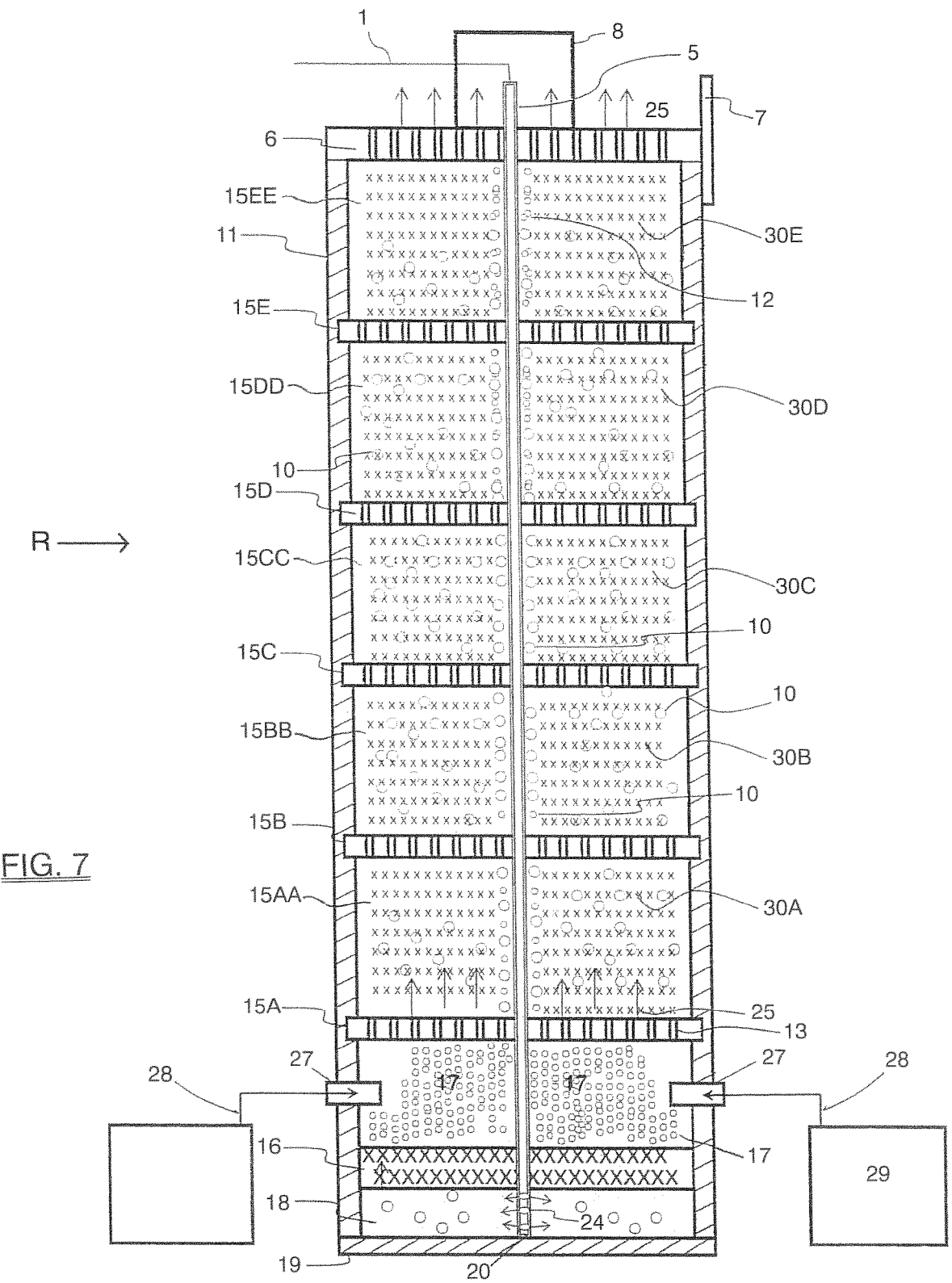
FIG. 7 is a cross-section elevation view of another treatment reactor of the present invention that contain no chimneys but utilizes a sump pump.

Another reactor embodiment is shown in FIG. 7 that is similar to the reactors shown in FIGS. 1 and 5. Accordingly, a great majority of the parts numbers in FIG. 7 are the same as in FIGS. 1 and 5 and thus the description of the parts as well as operation of the reactor of FIG. 7 are very similar to that of FIGS. 1 and 5 and hence will not be repeated but rather are hereby fully incorporated by reference with regard to the description as set forth in FIGS. 1 and 5. The reactor of FIG. 7 is different than the reactors in FIGS. 1 and 5 in that it does not contain any chimney pipes 9. Rather, sump pumps 29 pump the aqueous waste composition through wastewater inlet pipe 28 and subsequently through reactor inlet pipe 27 into aqueous wastewater composition chamber 17 where it mixes with incoming air bubbles from air pressure chamber 18. The reactor design of FIG. 7 is more efficient than the reactors set forth in FIGS. 1 and 5. Inasmuch as the reactor of FIG. 7 does not contain chimneys, flow of air and aqueous waste composition from chamber 17 will be forced to flow through the packing from chamber 15AA into chamber 15BB and subsequently into chamber 15CC, etc., and thus the residence time is prolonged. Longer residence time allows more oxygen containing air bubbles to be trapped by the packing substrates 30A, 30B, 30C, etc., to further enhance the level of dissolved oxygen, therefore bio-remediation. Thus, the effluent admitted from reactor of FIG. 7 is generally pure water.

FIGS. 8-20 relate to bio-remediation systems that utilize various reactors such as the types set forth in FIGS. 1, 5, and 7. All of the systems in FIGS. 8-20 contain various types of tanks that contain aqueous waste compositions that require remediation. Additional items include air pumps 26, sump pumps 29, optional nutritional and/or chemical feeding pumps 14 or essential nutritional or chemical feeding pump 35, and recirculation pumps 23. As should be apparent to those skilled in the art, the above combination of reactors, tanks, and various pumps result in a large number of systems that can be utilized all according to the present invention. For purposes of brevity, since the description of the various reactors have been described hereinabove, the components, operation and process thereof will not be repeated but rather is hereby fully incorporated by reference. As also should be apparent to those skilled in the art, FIGS. 8-20 relating to different bio-remediation systems can generally be described as flow diagrams that teach various combinations of the above-noted items of the present invention. Hence, a brief description of the various figures will be set forth. Such bio-remediation systems can generally be utilized in a large number of different applications such as industrial, commercial, municipal, and the like as noted hereinabove. Desirably the embodiments of FIGS. 6 and 8-15 can be used for septic tanks, grease interceptors, in lagoons, and ponds. The system set forth in FIGS. 16 and 17 can be used to treat industrial wastewaters whereas the embodiments set forth in FIGS. 18-21 are well suited for use in wastewater treatment plant aeration basins, pump stations, lagoons, and ponds.

Figure 8:
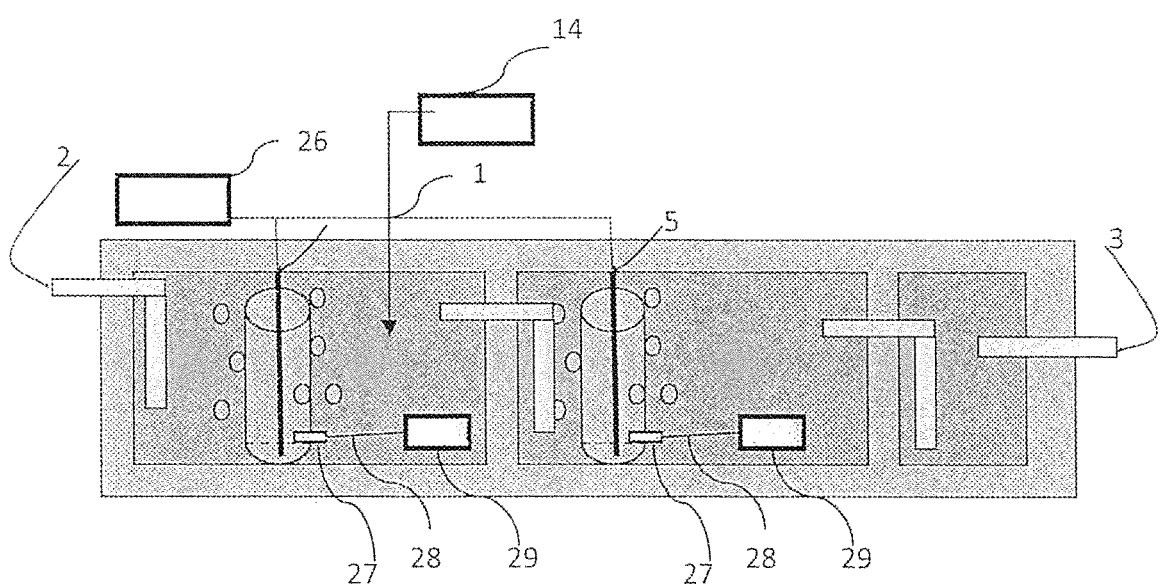
FIGS. 8 and 9 are cross-section elevation views of a tank containing reactors of the present invention therein.

FIG. 8 relates to a treatment system very similar to FIG. 6 except that the reactors of FIG. 8 are those as set forth in FIG. 7, that is, i.e. no chimneys. Accordingly, air pump 26 pumps air through air line 1 into the left reactor and the center reactor of FIG. 8. Both the left tank and the center tank of FIG. 8 contain sump pumps 29 therein that force the aqueous waste composition fluid through pipeline 28 and through reactor inlet pipe 27 into the bottom of the reactor. Bio-remediation thus occurs as described in FIG. 7 and thus will not be repeated but rather is hereby fully incorporated by reference. As with FIG. 6, the aqueous waste composition such as fats, oils, or greases as from a restaurant is pumped into the left tank wherein it is bio-remediated by the FIG. 7-type reactor. A portion of the treated aqueous waste composition of the left tank then overflows into the center tank of FIG. 8 wherein it is further bio-remediated by the reactor therein. Subsequently, a continuous amount of overflow of the treated aqueous waste composition of the center tank overflows into the right-hand tank wherein it can be further treated or not treated and is subsequently passed through outlet wastewater line 3. An optional aspect of FIG. 8 as well as FIG. 6 is that a nutrient and/or chemical pump 14 can be utilized to pump various nutrients into the left-hand tank such as sodium bicarbonate or calcium carbonate solution to adjust alkalinity for nitrifiers to oxidize ammonia-containing substances to nitrite and nitrate so that nitrification and denitrification can be achieved. Alternatively, pump 14 can be utilized to supply various chemicals to the tank to further treat the waste compositions therein.

Figure 9:
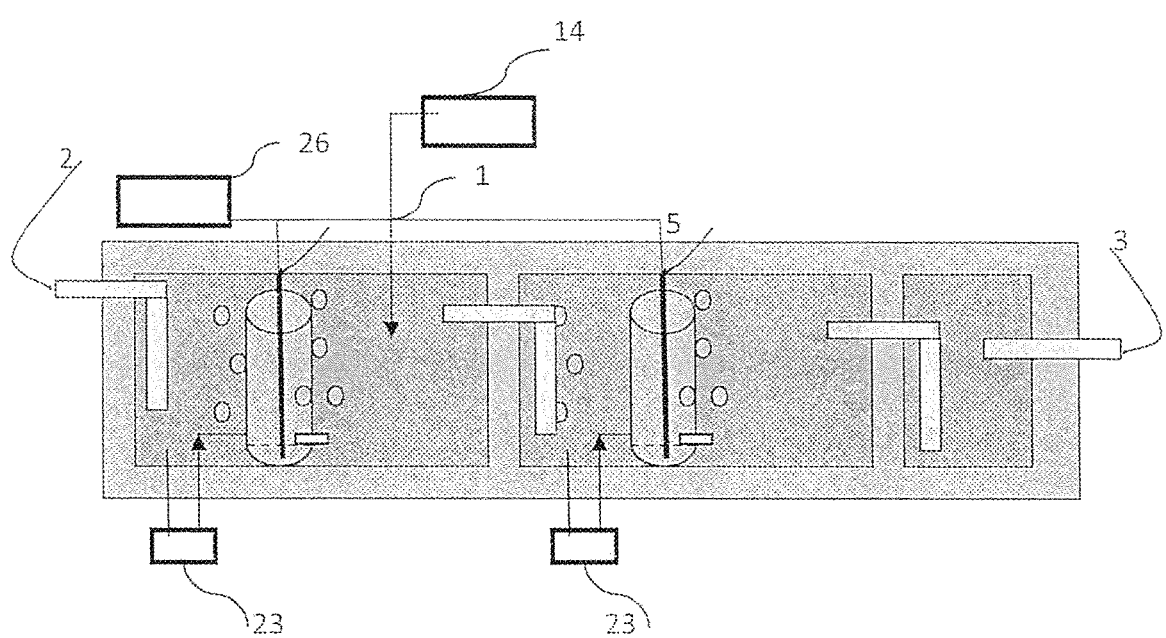

Referring to FIG. 9, the system thereof is similar to FIG. 8 except that instead of utilizing sump pumps 29 located within the tank, a portion of the aqueous waste composition in each tank is withdrawn from the tank and recirculated through external recirculation pump 23 and then to the bottom of the FIG. 7-type reactor.

Figure 10:
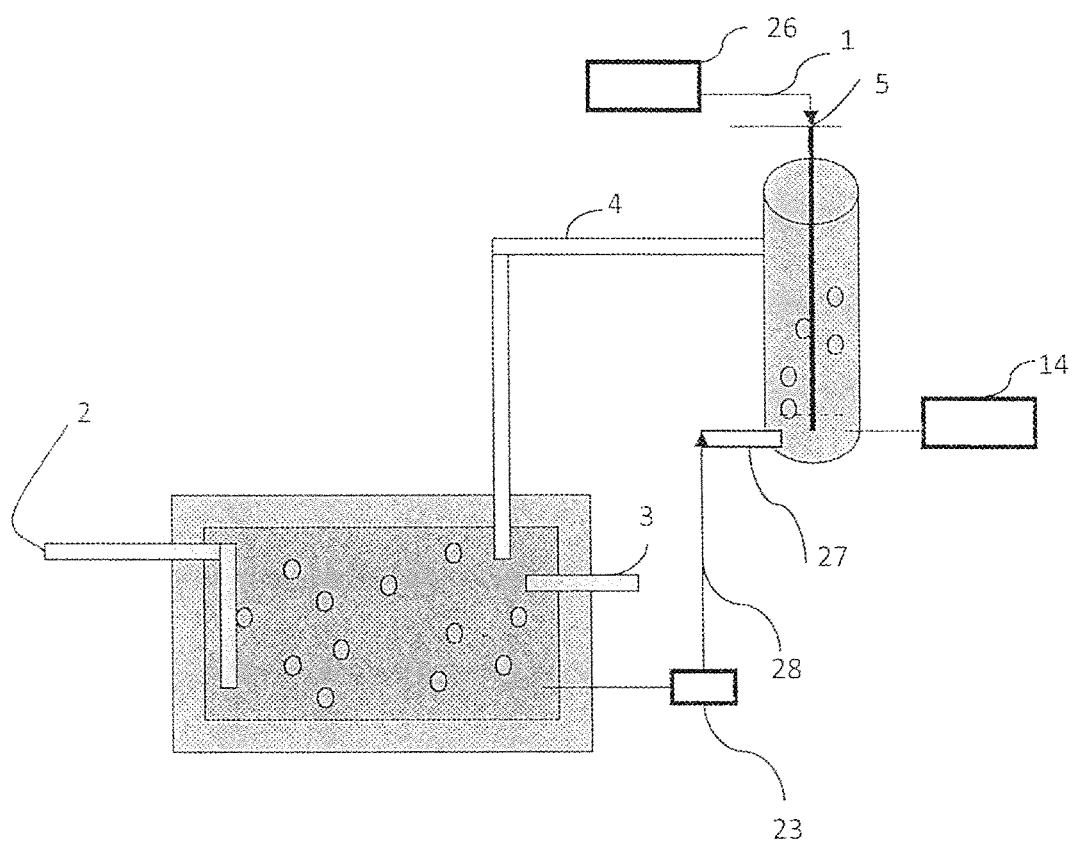
FIGS. 10, 11, and 12 are cross-section elevation views showing a bio-remediation tank containing an aqueous waste composition where a reactor outside of the tank is utilized.
Figure 12:
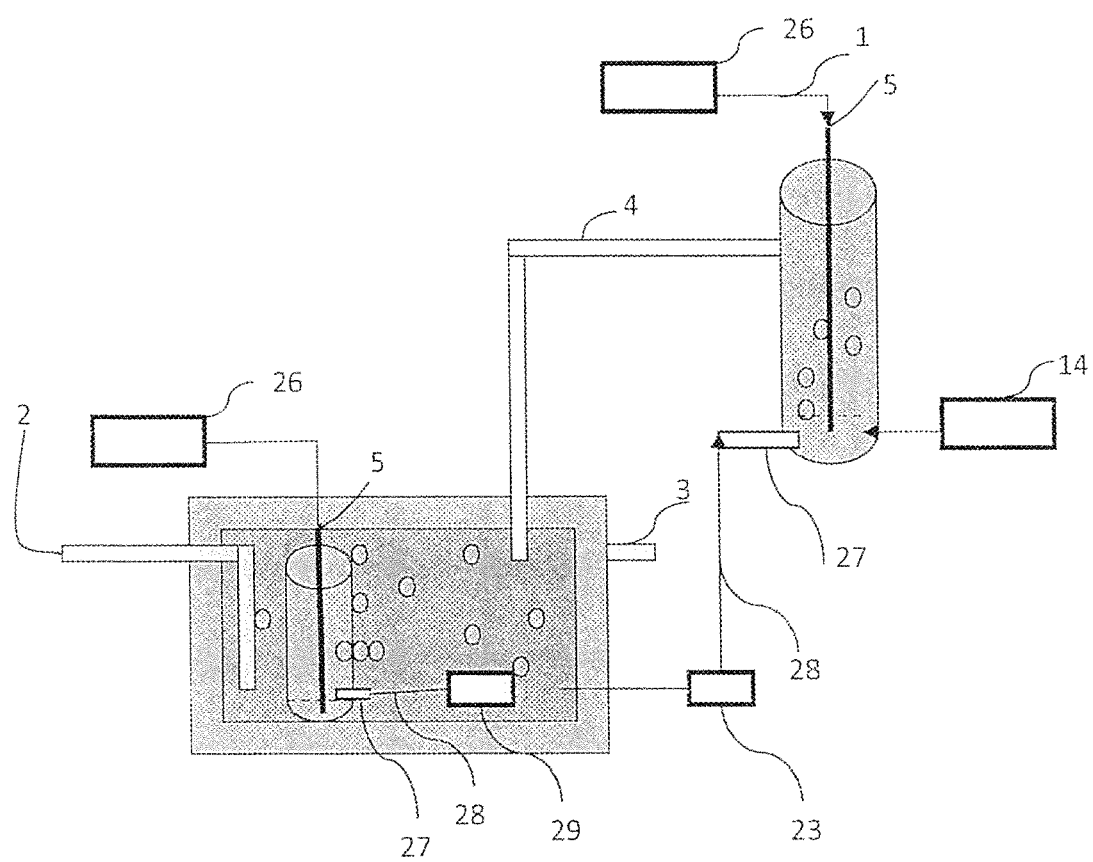

Similar bio-remediation systems are shown in FIGS. 10, 11, and 12. As apparent from the flow diagrams, an aqueous waste composition is withdrawn from the tank by recirculation pump 23 and is fed via inlet pipe 28 to reactor inlet pipe 27 wherein it is bio-remediated. The reactor is of the type set forth in FIG. 1 or 5 inasmuch as air is pumped into the reactor with the treated or bio-remediated waste composition being recirculated back into the tank via line 4. Optionally, nutrient or chemical compounds can be added to the reactor via pump 14. The system of FIG. 11 is similar to FIG. 10 except that additionally the tank contains a reactor of the type set forth in either FIG. 1 or 5 and thus has an air pump 26 that feeds air via line 1 into the reactor. The bio-remediation system of FIG. 12 is similar to that of FIG. 11 except that sump pump 29 is utilized to pump the aqueous waste composition in the tank via pipe line 28 into the reactor inlet pipe 27.

Figure 13:
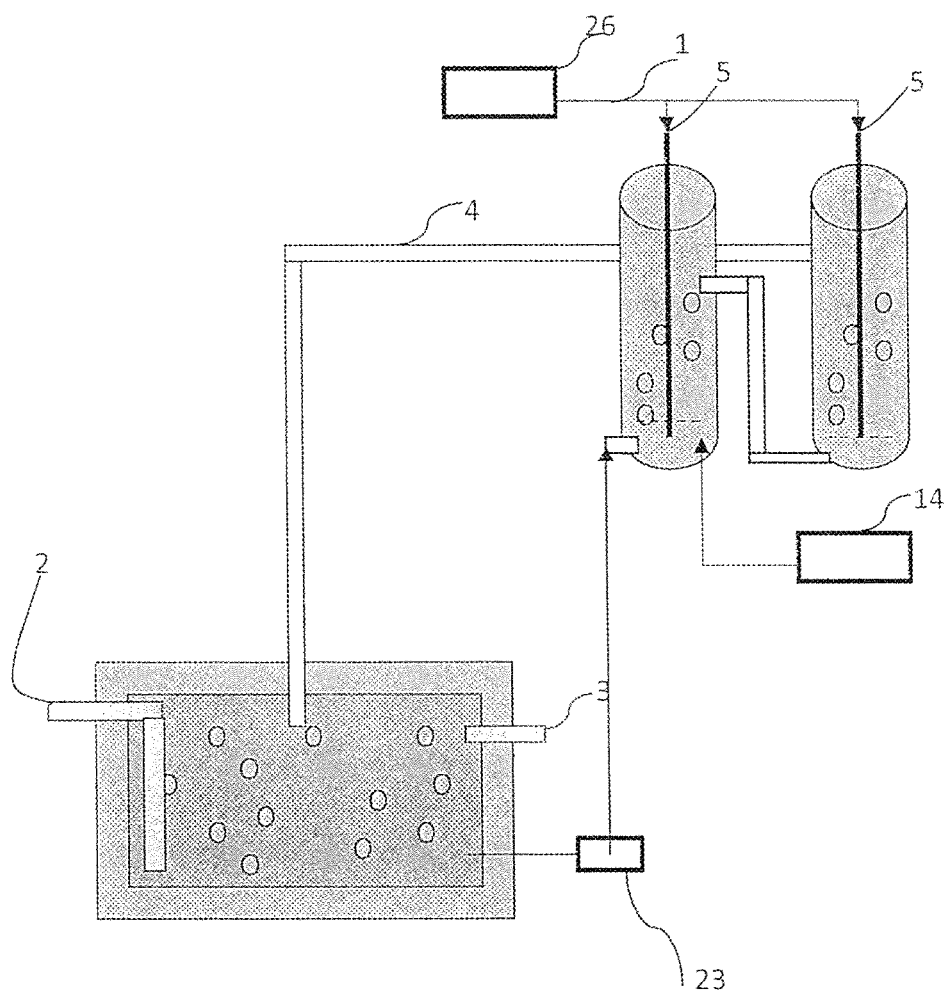
FIGS. 13, 14, 15, 16, and 17 are cross-section elevation views of different bio-remediation embodiments of the present invention wherein two reactors are utilized and are located outside a tank containing an aqueous waste composition therein.
Figure 14:
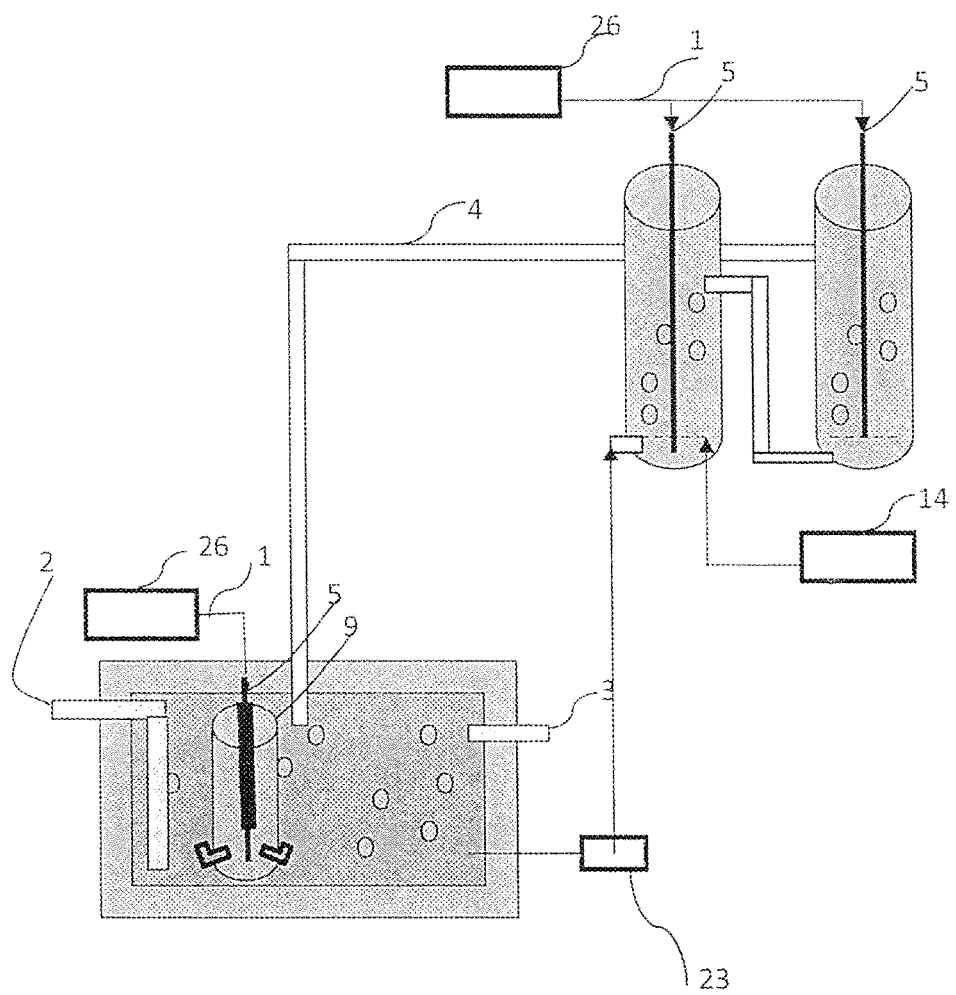
Figure 15:
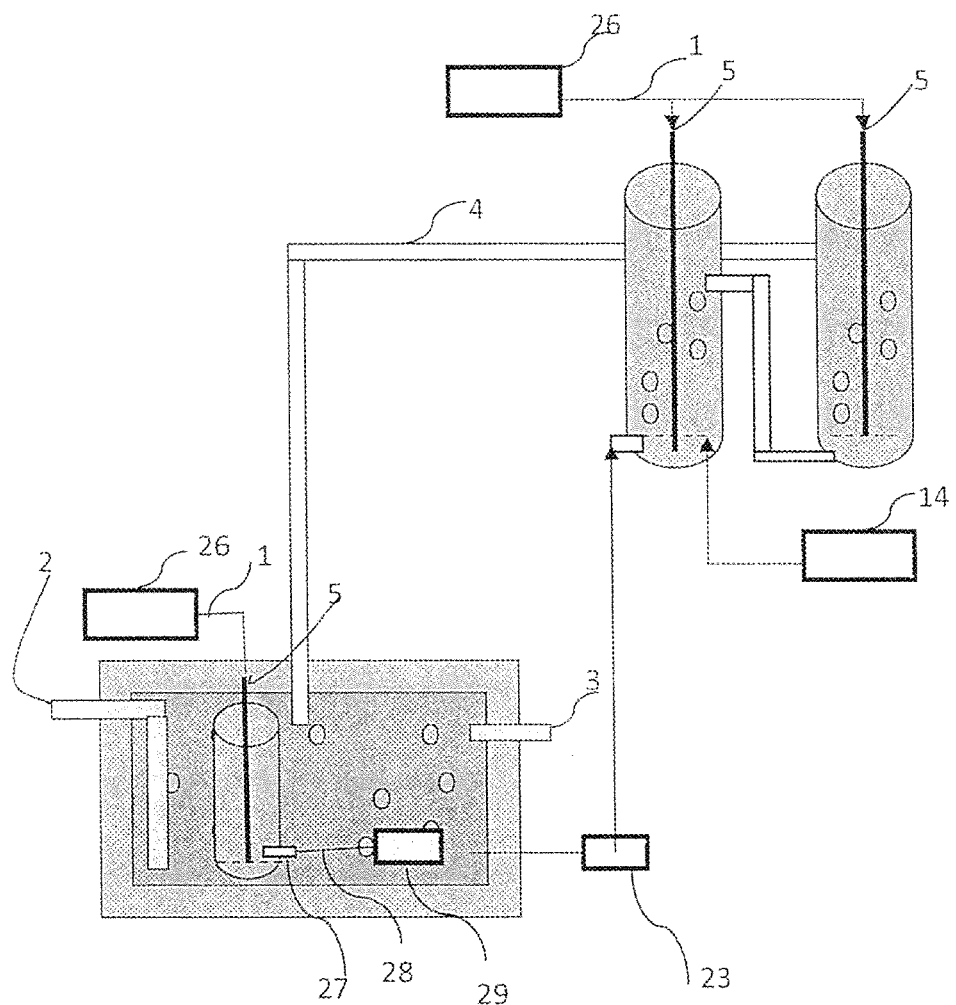
Figure 16:
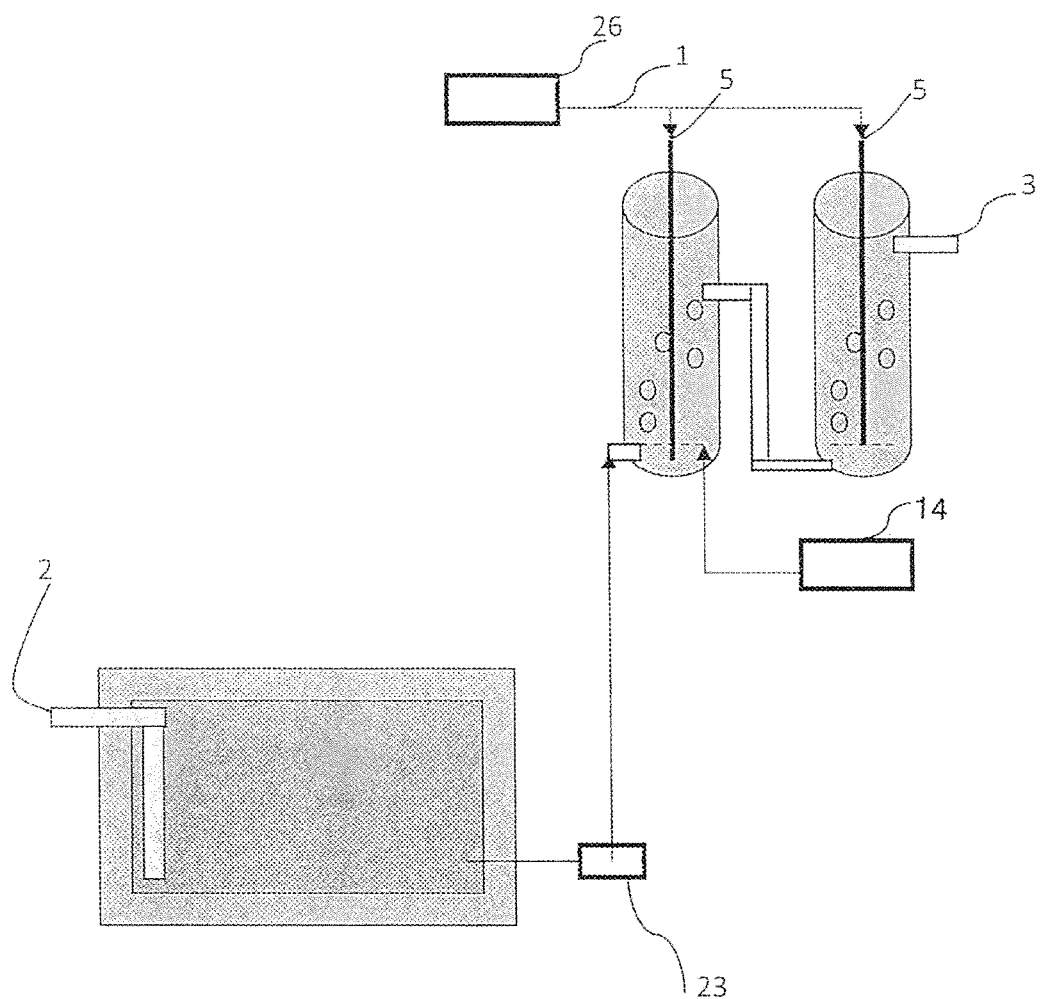
Figure 17:
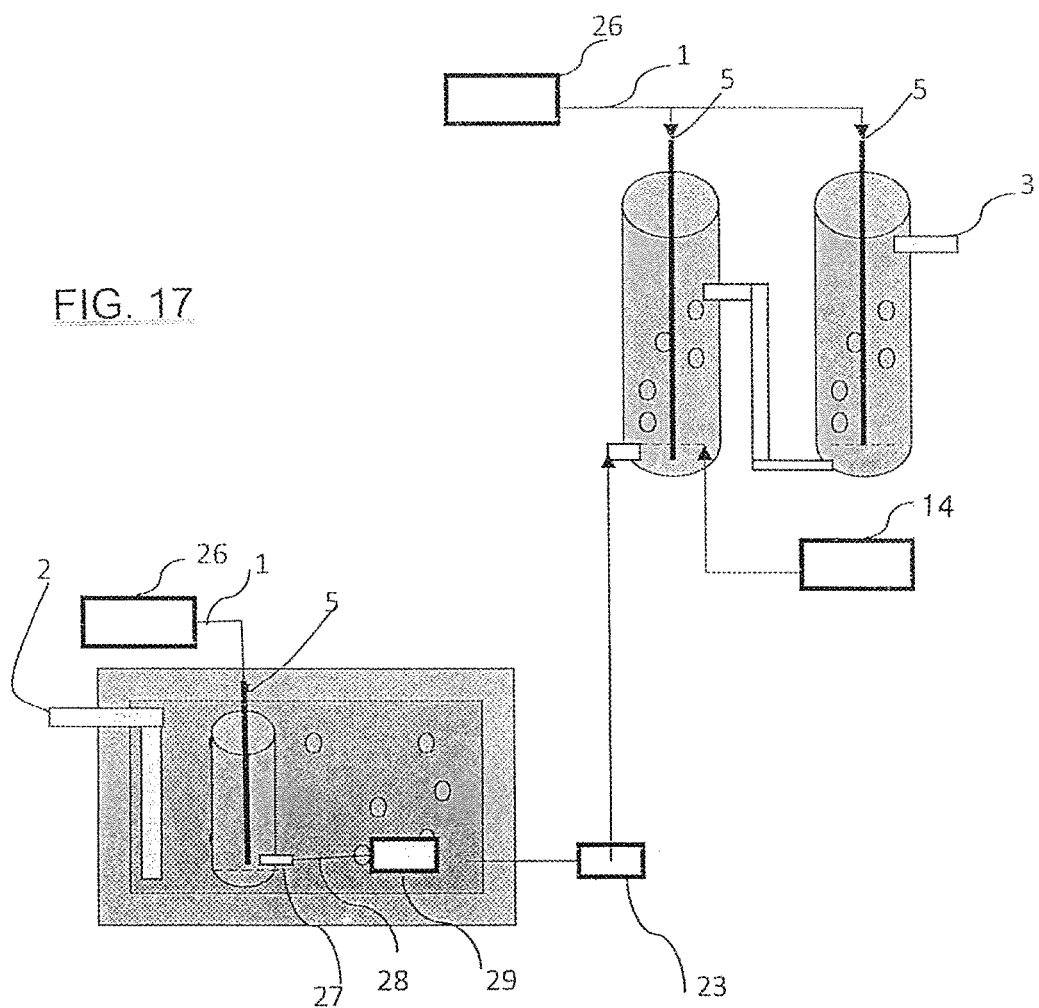

The bio-remediation embodiments of FIGS. 13-15 are similar. In FIG. 13, aqueous waste compositions are withdrawn from the tank and via recirculation pump 23 are fed to a first reactor and after bio-remediation therein, the effluent waste composition is fed to the bottom of a second reactor. Both reactors are air fed. Thus, both reactors are of a type set forth in FIGS. 1 and 5. The treated waste composition is then transferred from the second tank via water return line 4 to the tank. The process continues until all the waste composition in the tank has been treated so that the remaining water meets acceptable government regulations, etc. An optional aspect of each FIGS. 13-15 is the utilization of a nutrient and/or chemical pump 14 to pump such compounds into the bottom of the first tank. The system of FIG. 14 is similar to that of FIG. 13 except that additionally, it contains an air pump type reactor as described in FIGS. 1 and 5 wherein through air pump 26 and feed line 1 the air is admitted to the reactor that is located within the tank. The embodiment of system of FIG. 15 is similar to that of FIG. 14 except that sump pump 29 is utilized to pump the waste composition through feed pipe 28 into the reactor inlet pipe 27. The remediation system of FIGS. 16 and 17 are similar to FIGS. 13 and 15, respectively, except that instead of recycling the treated waste composition from the second reactor back to the tank, it is merely transferred out of the upper portion of the second reactor through outlet pipe 3 to any desired location. This system is proposed for industrial wastewater treatment in which industrial wastewater will contain unusual combinations of chemicals, hydrocarbons requiring special microorganisms to biodegrade. In these systems different types of microorganisms and their mutants can be housed in bottom-fed upward-designed packed column reactor.

Figure 18:
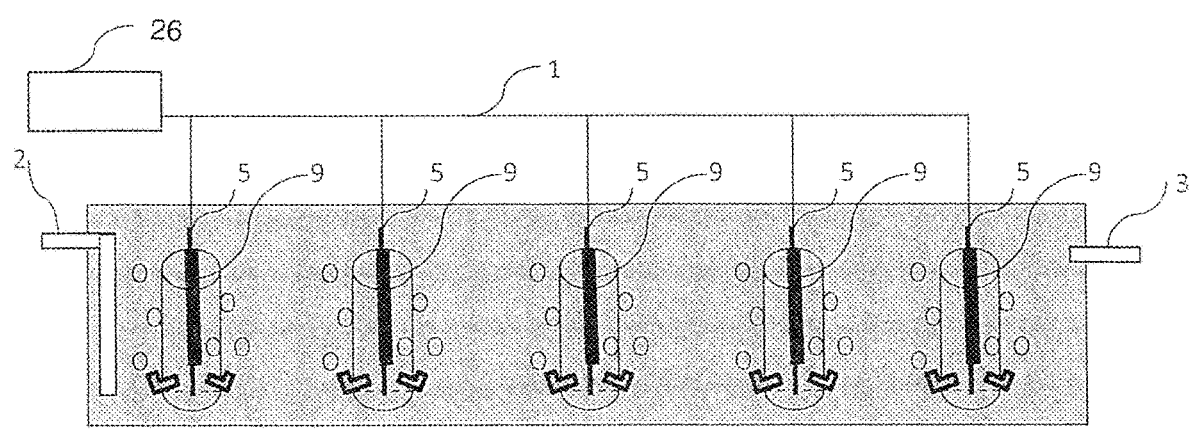
FIGS. 18 and 20 are cross-section elevation views showing additional bio-remediation embodiments of the present invention wherein five reactors are located within a tank containing an aqueous waste composition.
Figure 19:
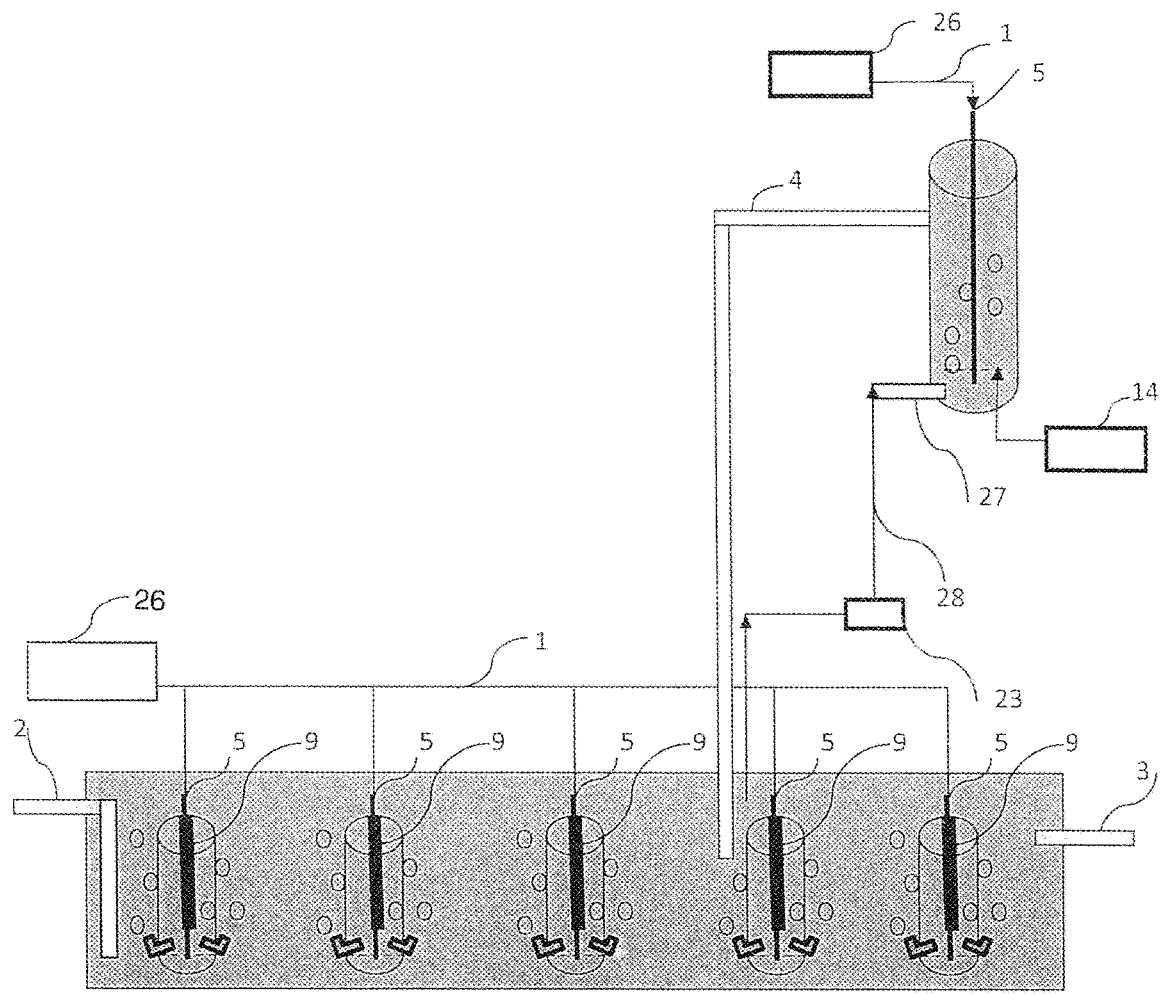
FIGS. 19 and 21 are a cross-section elevation view of further bio-remediation embodiments of the present invention wherein five reactors are located within an aqueous waste composition containing tank and one reactor is located outside of the tank.
Figure 20:
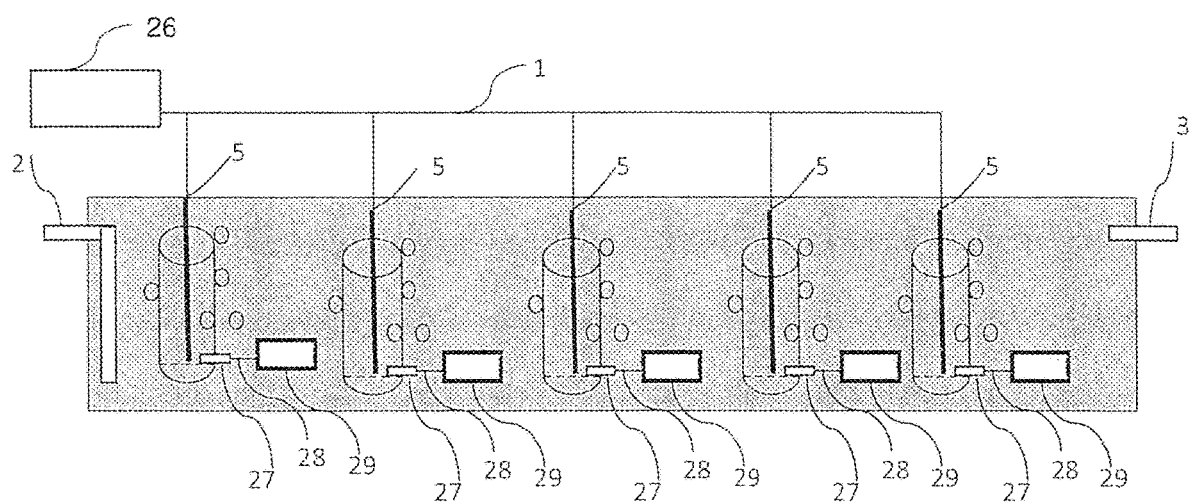
Figure 21:
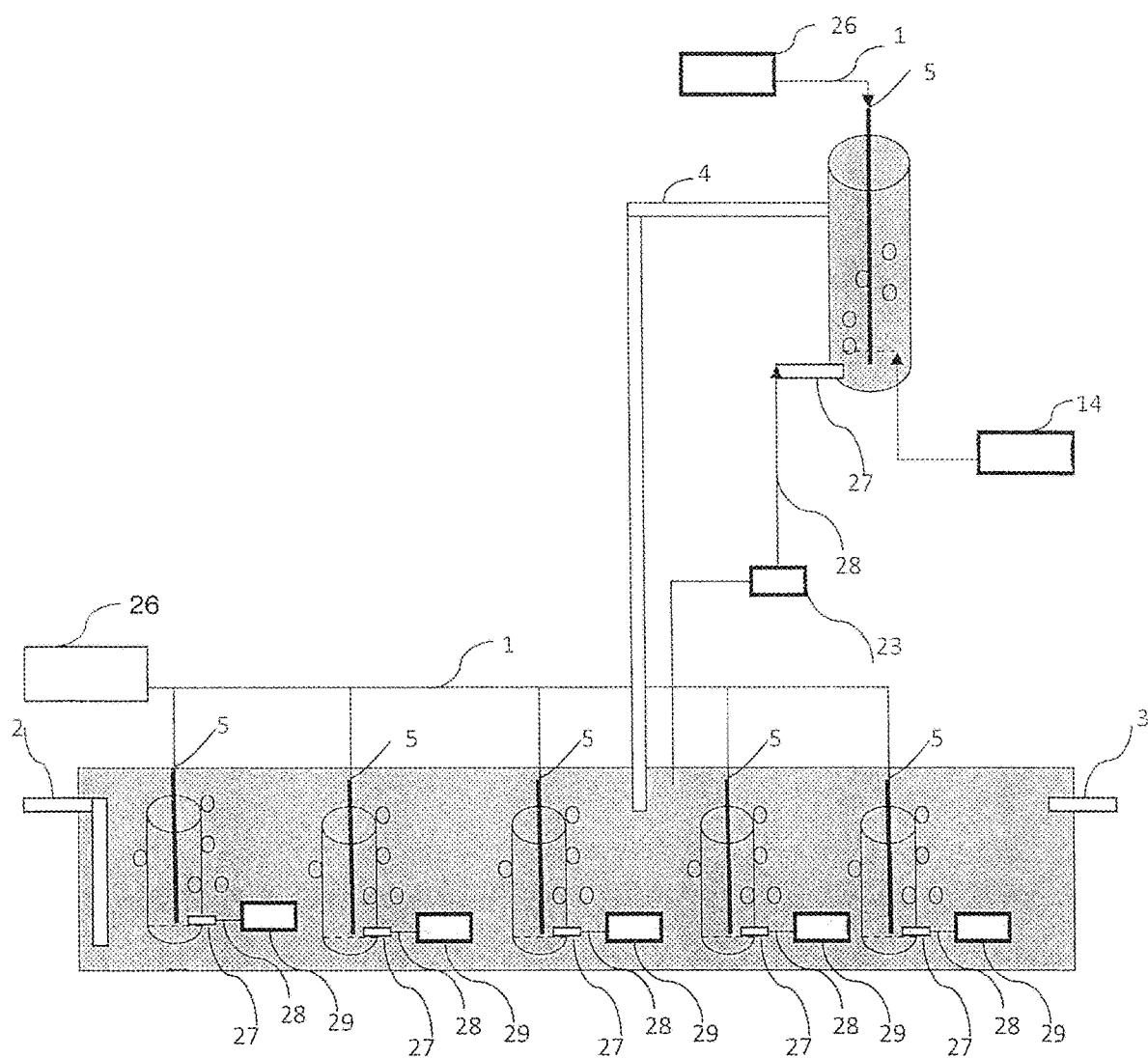

The bio-remediation system of FIGS. 18-21 is similar. In the system of FIG. 18, five reactors are contained in an elongated tank containing an aqueous waste composition. Air pump 26 feeds air into each of the five reactors that are of a type as set forth in either FIG. 1 or 5. Input of the waste composition is through tank inlet line 2 and the treated aqueous wastewater exits through outlet line 3. Naturally, each of the five reactors draws the aqueous waste composition into the bottom of the reactor and expels purified wastewater through the top of the reactor. Since the flow of the aqueous wastewater composition is from the left to the right of the elongated tank, each successive reactor will further cleanse the wastewater until it is purified at the right side of the tank and expelled through outlet line 3. The bio-remediation system shown in FIG. 20 as apparent from the flow diagram thereof is similar to that of FIG. 18 except that sump pumps are utilized with respect to each reactor to transfer the waste composition into the bottom of the reactor via pipe 28 and into reactor inlet pipe 27. The bio-remediation system disclosed in FIG. 19 as apparent from the flow diagram thereof is similar to FIG. 18 except that a portion of the aqueous waste composition is transferred via recirculation pump 23 and pipe line 28 to inlet pipe 27 of a reactor. The reactor has air pumped therein via pump 26 and line 1 and thus the reactor is of a type as set forth in either FIG. 1 or 5. After treatment in the reactor, the treated waste composition is recirculated back into the elongated tank. In this embodiment, once again nutrients or chemicals can be optionally added to the reactor via pump 14. The bio-remediation embodiment shown in FIG. 20 is very similar to that shown in FIG. 19 in that it includes a reactor located outside of the tank. However, in lieu of wastewater flow into the bottom of the reactors located within the tank, sump pumps 29 are utilized to feed the aqueous waste composition via inlet pipe 28 into reactor inlet pipe 27.

As should be apparent from FIGS. 8-21, numerous different types of bio-remediation systems exist according to the concepts of the present invention utilizing reactors having chimneys and in association with various items such as sump pumps, air pumps, nutrient pumps, additional reactors, and the like.

Description of the Tube Reactor

Another important aspect of the present invention is the utilization of a tube reactor of a type set forth in U.S. Pat. No. 9,162,909, granted Oct. 20, 2015, hereby fully incorporated by reference with regard to all aspects thereof, that is converted to an open bottom tube reactor. This patent relates to waste water compositions comprising numerous compounds, waste sources and materials that are treated by aerobic remediation with various microorganisms in an aqueous environment with an oxygen source such as air. Waste water compositions generally include industrial, residential, commercial, sewage, restaurant, and other sources, and the like. Alternatively, the present reactor relates to a tube reactor that is made with the noted open bottom area.

An embodiment of the tube reactor of the present invention is shown in FIGS. 22A, 22B, 22C, and 22D wherein identical numbers generally refer to identical compounds, structures, packings, packing surface area, pore size, microorganisms, and the like, as set forth herein above, and the same is hereby fully incorporated by reference.

Tube reactor R comprises a housing that is an exterior barrier or wall 11 that confines the various components of the reactor shown in FIGS. 22A, 22B, and 22C. Reactor R generally is free of perforated separators 15 as shown in FIGS. 1, 5, and 7. By the term "free of", it is meant that at most only two or one vertically but separately located separators exist and preferably none, that is, no perforated separators exist.

The reactor can have any cross-sectional shape such as square, rectangular, cylindrical, oval, and the like. Air is admitted from an air supply line 1 to the reactor via an air pump, not shown, that supplies air through air conduit 5 located at the top of the reactor and extends to the bottom of the reactor to air chamber 18 wherein the end of the air conduit is perforated so that air containing oxygen can fill chamber 18. Since the air is under pressure, it is forced through micro-porous diffuser 16 that has tiny openings therein so the air is admitted into the reactor in the form of tiny bubbles 10. For purposes of clarity, air bubbles exist within the reactor in tube 40 and non-tube areas 42 but are not shown.

An important aspect is that one or more tubes 40 are contained in each reactor and can be generally made out of various types of materials such as ceramics or metals, with polymers or plastics being preferred. In order to enhance mixing and dissolving of oxygen into the liquid waste material, the tubes have perforations 41 in the wall side portions thereof. The exact shape of the perforations is not important so long as they are large enough to permit the aqueous waste composition and air or oxygen to flow there through and to retain packing substrates therein.

Packing substrates 30 can be made out of many different types of materials such as minerals, carbon substrates, ceramics, metal substrates, wood chips, polymers or plastics, and the like. Examples of such substrate materials are set forth herein above and are hereby fully incorporated by reference. An important aspect of the packing substrates is that they can be of any size, shape, and type that aids in dissolving high amounts of oxygen into the waste water. The amount of dissolved oxygen is at least 1 part by weight, desirably at least about 2 parts by weight, and preferably from about 3 parts to about 8 parts by weight per million parts by weight of the waste water.

Packing substrates 30 contained either within tubes 40 or within non-tube areas 42 can be the same or different as set forth hereinabove and fully incorporated by reference and have high average surface areas, are porous and have a large number of pores therein. The types of specific packing substrates will vary depending upon the type of aqueous waste water being treated. An important aspect of the invention is that multiple substrates are used. The different types of substrates 30 allow for microbes to adhere to the substrates that best suite them. Not only is a wide diversity of microbes created throughout the reactor, but also certain microbes are allowed to prosper on certain substrates over others. Preferably multiple types of packing substrates are utilized such as, independently, 2, 3, or 4, up to a large number such as about 10, 20, or 30 with typically from about 2 to about 5 or 10 being utilized.

The combination of the tubes having perforations on the side walls thereof with the packing substrates located within the tubes have been found to efficiently yield dissolved oxygen within the waste water and result in good bioremediation thereof. The tube perforations also permit air and liquid waste to flow into and out of the tubes.

While non-tube areas 42 of the reactor, independently, can contain multiple types of more packing substrates 30, it is desired that they contain only one type of packing substrate therein. The advantages of utilizing only one type of substrate exists during maintenance of the reactor. During maintenance the removal of substrates without mixing is important. Having a single type of substrate guarantees that there will be no mixing upon removal and that the non-mixed substrate can be re-used in the future in the same or different reactor. Having control of substrate quantities is also important to the effectiveness of the reactors. When substrates mix, control is lost. The specific type of a packing substrate in non-tube areas 42 will also vary with the composition and types of waste water being treated.

At least one tube, desirably a majority, and preferably all tubes are open at the top end thereof so that the air and dissolved oxygen can readily exit the tubes and further promote good mixing in the upper portions of the tube. Thus, a dead oxygen zone is prevented.

Desirably, most, and preferably all of the tubes have perforated bottom, horizontal wall portions 43 of a size that retain the packed substrates therein but freely allows the aqueous waste and air to pass there through. Bottom wall perforations 44 thus permit air as from chamber 18 and micro diffuser 16 to migrate into the bottom of the tubes 40 such as the center tube 40 of FIG. 22A. This aspect immediately promotes good mixing of the air and dissolving oxygen into the liquid waste as well as to increase the concentration of the microorganisms to promote bio-remediation. This aspect is also shown in FIG. 22C at the bottom right hand portion thereof.

In the bottom right hand portion of FIG. 22A, an embodiment is shown wherein tube 40 that has perforations 44 on the bottom horizontal end wall 43, resides upon cylindrical bottom cap 48 that is open at the top end thereof. However, the bottom portion of bottom cap 48 does not have perforations. When the type of packing substrate utilized that is somewhat degradable such as those derived from natural materials, for example carbon substrates such as charcoal, coal, wood chips, etc. they can deteriorate during use and break up into very fine particles and settle into bottom cap 48 as dust, fine debris, and the like. Rather than to remain within the reactor, tube 40 can be removed along with cap 48 with the dust therein removed from the tube. If the packing substrates are degraded, or when setting of the packing substrates occur, top cap 47 can be removed and additional packing added to the tube. Tube 40 and bottom cap 48 can then be placed back in the reactor. These operations promote oxygen dissolving efficiency of the reactor over extended periods of time. Bottom caps 48, independently, can be removable or non-removable from the various tubes.

Cap 47 closes the top end of the tube at a vertical distance above the reactor waste water level and thus prevents the packing substrates from being discharged therefrom as upon a tipping of the reactor. Caps 47 preferably have perforations at the top portion thereof that, as with perforations on the side wall of the tubes, retain the packing substrates within the tubes but readily permit the flow of gas such as air therethrough. The caps can be made of the same material as a tube and can be attached thereto in any suitable manner such as via friction fit, a threaded engagement, and the like. Optionally, the tubes need not have a cap, but this aspect is not desired.

Another embodiment of the present invention is shown in FIG. 22D wherein a porous sock 50 is utilized to retain one or more types of packing substrates therein. Preferably only one type of substrate is utilized in each sock. Moreover, multiple socks 50 can be stacked on top of each other within each tube 40 where each sock 50 can contain only one but a different type of substrate. Socks allow substrates to pre-inoculated with microorganisms via hanging them in existing waste waters with active aerobic microorganisms. The use of socks also allows for examination of how much of a specific type of a mineral substrate depletes over time. The durability of a mineral substrate can also be tested as by assessing the weight differential of a sock from the initial assertion to its actual removal (potential degradation) after use.

The sock can be conveniently located in one or more tubes 40 and contain a partial amount of the packing substrates located within a tube or envelop all of them. Part or all of the packing material therein can thus be conveniently removed without removing tube 40 from the reactor. An advantage is that all or part of the packing in an individual tube can be removed and replaced with different types of packing substrates as when the environment of the liquid waste has been changed. Another advantage is that tube can be repacked with different microorganisms. Of course, air and the liquid waste material can flow in and out of the sock.

Sock 50 can be made out of any type of material that generally is not readily degradable such as polymers, and natural fibers.

Desirably, the reactor contains at least one chimney 9 having perforations 12 in the sides thereof as well as in the top and bottom horizontal end portions thereof. While the chimney can contain packing substrates, preferably it is substantially free of any substrates. That is, the amount of any substrate within the chimney is generally less than about 20%, or less than about 10%, desirably less than about 5%, and preferably less than about 2% by volume, and most preferably none. Use of packing above these amounts will significantly reduce the effectiveness of the reactor unit and require maintenance to remove the various packing substrates.

The use of a chimney is essential to the efficient operation of Reactor. The chimney permits air as from air supply line 5 to travel unimpeded from air pressure chamber 18 upwardly to the top of the reactor and thus exerts a constant upward pull on the waste water. In other words, the generally unimpeded bubbling of the air through the one or more chimneys creates an upward draft forcing the waste water to move more quickly through the system and also encourages mixing of the waste water with the packing substrate containing the microorganisms thereon that results in a shorter residence time, greater amounts of dissolved oxygen into the waste liquid, and enhanced bio-remediation. The liquid waste can freely enter the chimney and mix with the oxygen therein as well as flow out of the chimney into the surrounding reactor area.

The operation of the reactors set forth in FIGS. 22A-D is similar to that as set forth above with respect to the multistage reactors and thus is hereby fully incorporated by reference. By way of summary, perforated tubes 40 are filled with packing substrates that have or are subsequently treated with desired microorganisms that are attached, bonded, or otherwise applied thereto. Multiple different types of substrates 30 can, independently, be utilized in the one or more tubes, as well as multiple different types of microorganisms, independently, in the one or more tubes to bio-remediate liquid waste. The non-tube reactor areas 42 also have packing substrates added thereto that are, independently, coated or contain one or more different microorganisms. However, these packing substrates are preferably of only one type as noted above.

Subsequently, the liquid waste is added to the reactor and air from air supply 1 is added via air pipe 5 to air chamber 18. The air, being lighter than water, naturally will flow upwardly through the various tubes, the non-tube reactor area, as well as chimney 9 resulting in thorough mixing and dissolving of the air and oxygen into the waste material with bio-remediation occurring through the upward flow. Multiple different types of microorganisms are utilized in order to bio-remediate various types of compounds in the liquid waste. When one type of waste compound is in large supply, the number of microorganisms will grow to digest and eradicate the same. As noted, the microorganisms are preferably bound to the pores or substrates so that they are not washed away or flow out of the reactor. Due to generally high dissolved levels of oxygen of the present invention and lengthy retention times, the liquid waste is generally treated upon reaching the top of the reactor. Generally, upon subsequent treatments in additional reactors, typically it can be fully treated. Purification occurs upon subsequent disinfection by any convention system and/or process.

If the packing in a particular tube not containing a sock is degraded, the lever thereof will decrease and additional packing can simply be added to the top of the tube so that it is fully packed. If the sock is utilized in a tube, the reduced level of a packing can be corrected by opening the sock and adding more packing thereto. Another option is to simply replace the sock with a new one.

As noted, the utilization of bottom caps 48 serve to collect the degraded or dust-like packing and thus not block but rather permit air to enter through the bottom of a particular tube. Upon extended use of the reactor, various individual tubes can be removed, repacked, and reinserted into the main body of the reactor. However, in order to be able to remove a tube, the substrate surrounding all of tubes found within the non-perforated reactor housing 11 desirably must be removed. If the substrate from the non-tube areas 42 are not removed, the surrounding substrate will fill in the void space left by the removed tube thereby inhibiting a new tube or the same one from being reinserted. Alternatively, if sock 50 is utilized, the packing contained therein can be removed, repacked, and then inserted back within the tube without having to remove the tube from the reactor.

Since separators as set forth in FIGS. 1, 5, and 7 are not utilized in reactor tube embodiments, easy or ready access to replace selected or all the different types of the substrates in the reactor is available. For example, upon maintenance or changing the types of one or more microorganisms utilized and/or one or more packing substrates, the individual tubes that contain a sock can be serviced without removing any of the remaining packing substrates and/or microorganisms. Thus, a quick and efficient changing operation is achieved, as for example, with respect to a changing waste water environment. The changing of limited amount of the packing substrates instead of the entire reactor contents also results in less moving, frictional contact of the various packing substrates, and the like that results in less breaking of the various packing substrates. Other advantages include that the reactor can be adapted to the waste water environment. Additionally, one type of substrate can be removed and replace with a more efficient substrate in a given environment. Another advantage is reduced down time with regard to changing the packing thus increasing treatment time of the waste water.

The tube reactors 40 of the present invention as shown in FIGS. 22A through 22D can be substituted partially or totally for the various multiple chamber reactors, as discussed hereinabove, as for example shown in FIGS. 6, and 8-13 whether the tube reactors are located in a tank, container, or the like or in a natural environment such as a pond, lake, etc., or outside thereof. Moreover, the use of the tube reactors can be utilized with various types of recycled bio-remediation systems such as those shown in FIGS. 6, and 8-13. Accordingly, the description of the various bio-remediation systems such as shown in FIGS. 6, and 8-13 are hereby fully incorporated by reference and are not repeated for purposes of brevity.

Waste Water Aeration Treatment Facility or Tank

Waste water aeration treatment tanks are known to the art and to the literature and are the mainstay of treatment tanks utilized in the United States with regard to aerating waste water to purify, treat, and detoxify, and the same. Waste water is generated by industrial plants, manufacturing facilities, paper manufacturing plants, municipal sewage plants, and the like.

Heretofore, aeration has been commonly utilized to treat water as in water treatment plants, both commercial or municipal, with respect to carbon dioxide reduction, oxidation of iron and manganese found in many well waters, ammonia and hydrogen sulfide reduction, and also with respect to bacteria control. One of two general methods exist, i.e. water-fall aerated and an air diffusion method. The latter is more efficient.

Air diffusion systems aerate by pumping air into water through porous diffusers, strainers, porous plates, or tubes. Aeration by diffusion is theoretically superior to water-fall aeration because a fine bubble of air rising through water is continually exposed to fresh liquid surfaces, providing maximum water surface per unit volume of air. Also, the velocity of bubbles ascending through the water is much lower than the velocity of free-falling drops of water, providing a longer contact time. Greatest efficiency is achieved when water flow is countercurrent to the rising air bubbles.

Figure 23:
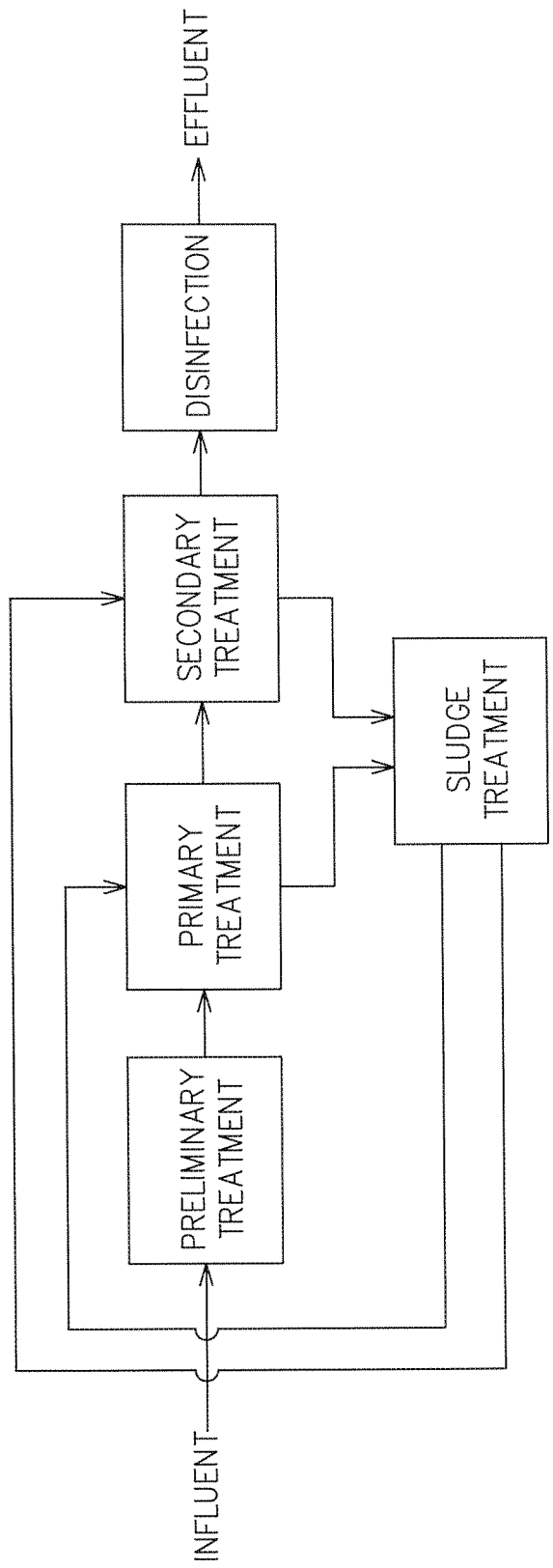
FIG. 23 relates to a schematic drawing of a typical prior art waste water treatment process containing 1) a preliminary treatment stage, 2) a primary treatment stage, 3) a secondary treatment stage, 4) a disinfection stage, and 5) a sludge treatment stage.

A general waste water diffusion treatment system is set forth in FIG. 23 that includes 5 stages:

Preliminary Treatment (1)

A physical process of using large bars or screens to remove large pieces of garbage from the incoming waste water (influent). By removing large trash in this initial step, the phase protects the main sewage system and equipment from potential damage.

Primary Treatment (2)

As waste water enters the sedimentation tanks (settling tanks) of the primary treatment phase, the flow of water is slowed. This permits heavier solids to settle to the bottom of the tank, while lighter particles float to the top. The settled solids (primary sludge) are pumped to another area for additional processing. The floating materials are skimmed off. The remaining partially-treated waste water then moves to the next phase in the treatment facility.

Secondary Treatment (3)

The secondary treatment (activated sludge process) is a biological phase. Air is introduced into the waste water aeration tanks. The air flow stirs the waste water and sludge, but it is the transfer of oxygen from its gaseous state to a liquid state that actually stimulate the growth of bacteria and other beneficial organisms that naturally exist in the waste water. By encouraging this bacterial growth, these microorganisms breakdown and consume a large portion of the organic materials. The aerated waste water moves into final settling tanks, where additional particles can sink to the bottom (secondary sludge) and be physically removed. The remaining waste water now passes into the disinfection phase.

Disinfection Treatment (4)

The disinfection treatment introduces chlorine (sodium hypochlorite) into the semi-treated waste water, for the purpose of killing harmful, disease-causing organisms. Upon completion of this process, the treated waste water is now referred to as "effluent" and is approved for release into local waterways (streams, rivers, lakes).

Sludge Treatment (5)

The treatment phase relates to collection and disposal of the primary sludge and secondary sludge.

The reactors R of the present invention described above can be modified to have an open bottom area so that when used in conventional waste water aeration treatment tanks including sewage tanks, that utilize air diffusers, bio-remediation is achieved. Alternatively, new reactors can be made with the noted open bottom area.

Modified or New Open Bottom Stage Reactor

The stage reactors R of the present invention can be made in a manner as described hereinabove and fully incorporated by reference, such as set forth in FIGS. 1, 5, and 7, but that they contain an open bottom area 55. That is, the above U.S. Pat. No. 8,372,285's stage reactors, hereby fully incorporated by reference, can be modified or made from scratch (i.e. new) to contain an open bottom area (e.g. below separation 15A) generally having legs 60 and generally lacks, that is, it is partially free or totally free (see FIGS. 1, 5 and 7) of, that is has no, bottom plate 19, waste water inlets 2 and 21, microporous diffuser 16, air or oxygen inlet pipes 1 and 5, and also bottom side wall 11.

Figure 24:
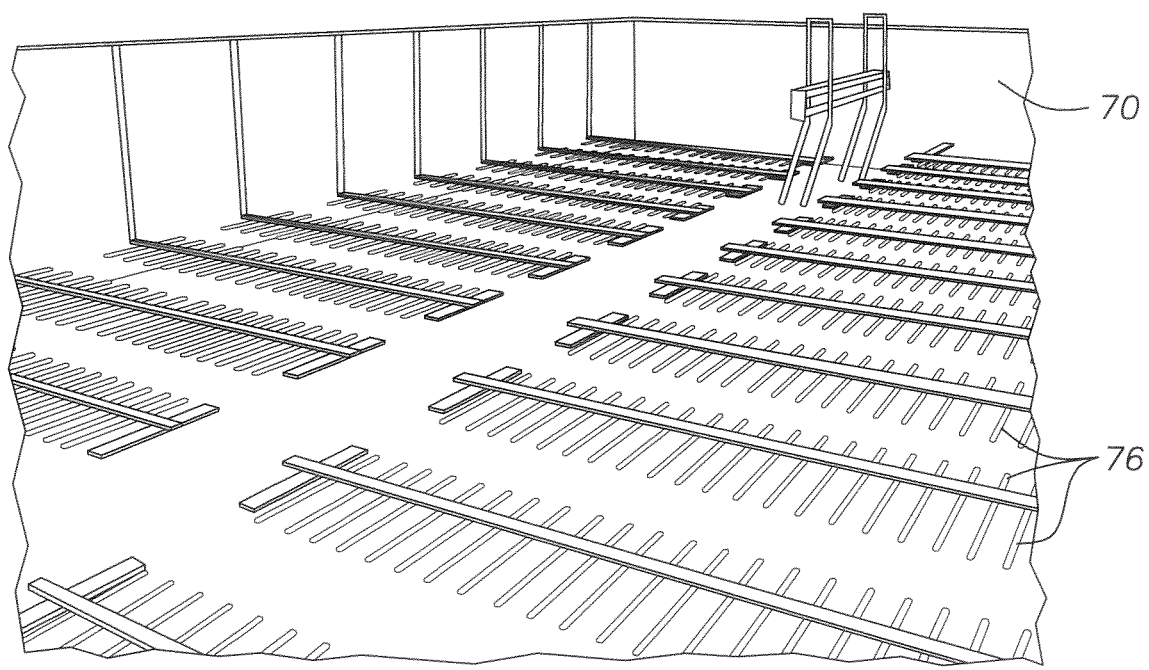
FIG. 24 relates to a waste water aeration treatment tank, having numerous diffusers therein.

By the term "open bottom area", it is meant deletion of at least a partial amount or portion, or a complete removal, of the reactor bottom areas that include bottom plate 19, or optionally side wall 11, or both, so that an effective amount of waste water, e.g. sewage, can enter the bottom of the stage reactor R and be treated, i.e. bio-remediated by an in waste water aeration tank as shown in FIG. 24. For example, an open bottom area or chamber 55 is at least partially free of reactor bottom plate 19 such as at least about 30%, desirably at least about 50%, and preferably at least about 70%, 80%, or 90% free of the total area thereof, and preferably the entire bottom plate 19 is removed; that is said stage reactor can have no bottom plate. Alternatively, in another embodiment, bottom area 55 can be partially free of reactor R bottom side wall area 11 between bottom separator 15A and any bottom plate, not shown, or substrate, or ground 68, such that at least about 30%, desirably at least about 50%, and preferably at least about 70% or 80% free of the total area thereof, is free of, and preferably the entire bottom side wall 11 is removed. Accordingly, an effective open area exists so that effective bio-remediation of the waste water occurs. In other words, an "effective amount" of waste water can flow into open bottom area 55 and be effectively bio-remediated in a reasonable amount of time. A support such as legs 60 generally exist to support modified stage reactor R and have a sufficient height so that the noted effective amount of waste water can flow into open bottom area 55. Such legs can include stanchions, poles, bars, and the like. Legs 60 can be independent legs, or be a partial portion of bottom side wall 11 that has not been removed. In any event, a sufficient number of legs exist that contact, rest upon, waste water aeration tank 70 (e.g. concrete bottom 68), to support the weight of stage reactor R and also give stability thereto, that is so that it does not tip over to one side or another.

Another modification to the bottom area of stage reactor R, is generally the removal of microporous diffuser 16, see FIGS. 1, 5, and 7. That is, stage reactor R is at least partially free or preferably is totally free; that is, can have no diffuser since diffused air is admitted to stage reactor R by waste water aeration treatment tank 70 that inherently has diffuser located at the bottom thereof.

Other items or structures of stage reactor R, see FIGS. 1, 5, and 7, that can be at least partially or totally free, e.g. removed or eliminated, with respect to the open bottom area, are air supply pipe 1 as well as air inlet pipe 5 and also any air inlet pump 26 which supplies the air to the stage reactor. That is, the reactor can have no air or oxygen pipe 1, air inlet pipe 5, or air inlet pump 26. Still further, stage reactor R and waste water inlet 2 or 21 can be partially or totally free, e.g. removed or eliminated, to obtain the modified open bottom area or stage reactor R of the present invention. That is, the reactor can have no waste water inlet 2 or 21. However, perforated separator 15A remains since it retains and supports packing substrates 30, of the bio-remediation stage reactor R. Desirably, chimney 9 remains since it is needed to pull air through the reaction and promote mixing of the waste water with the packing substrate. Moreover, the type of packing substrates 30 and the pore size and the surface area thereof can be the same as set forth herein above with respect to FIGS. 1, 5, and 7, hereby fully incorporated by reference.

As noted above, conventional standard waste water aeration treatment tanks 70 contain air diffusers at the bottom thereof wherein air and/or oxygen is admitted to the aeration tank. In accordance with the present invention, it has been found that adequate amounts of aeration are supplied by such standard conventional waste water aeration treatment tanks to the one or more modified aerobic stage reactors R such as from one to abut several, or even 100 or more modified stage reactors, so that the waste water is effectively and synergistically, bio-remediated to produce the above-noted advantages such as better solubilization of air and/or water, improved through put of the waste water, improved energy savings of power, improved economic benefit, and the like.

Figure 25:
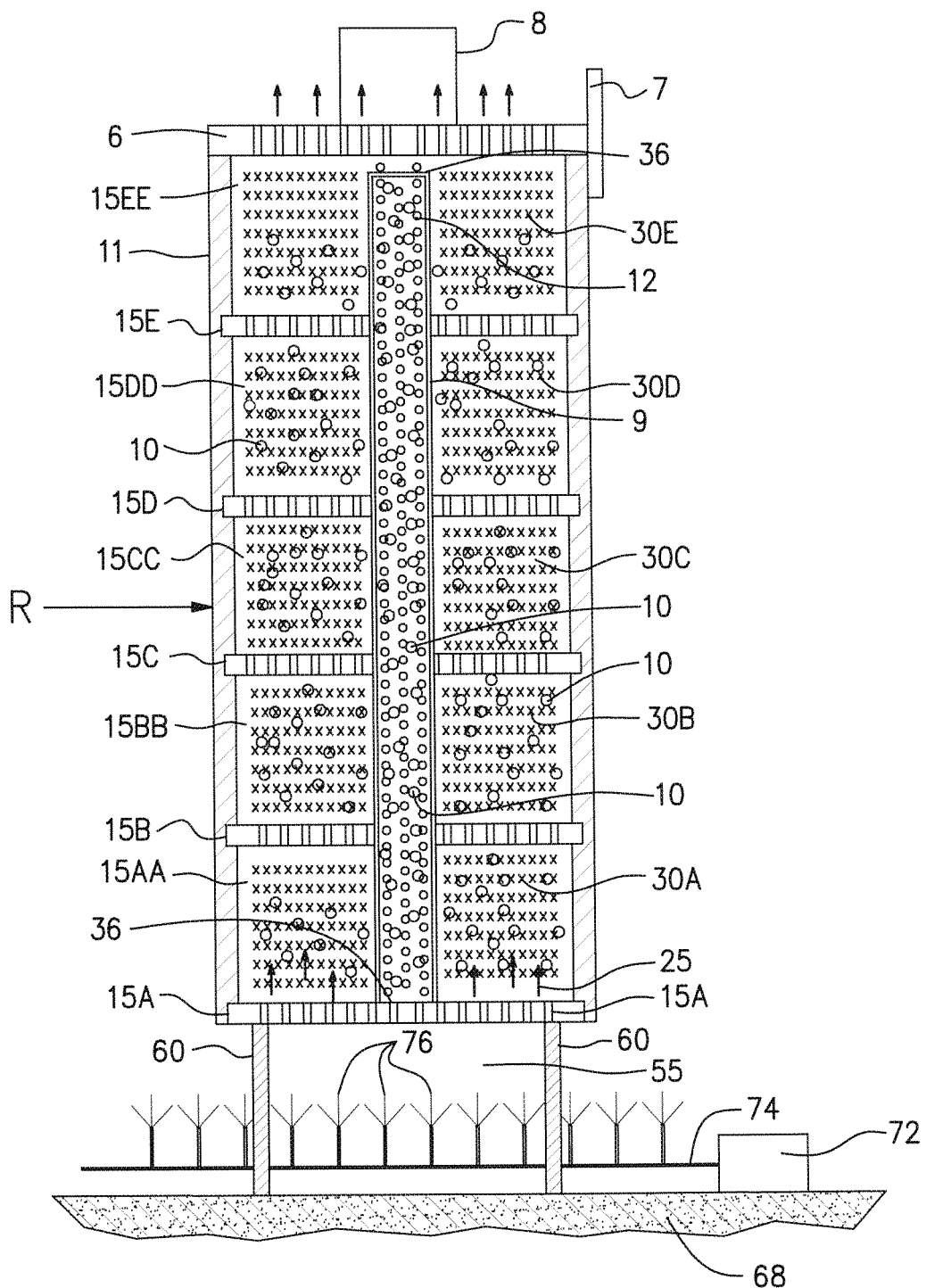
FIG. 25 relates to a modified or new, open bottom, stage reactor R of the present invention located in a commercial waste water aeration treatment tank.

In additional to waste water aeration treatment tanks containing waste water as from municipal sewage plant manufacturing or industrial facilities, noted above, other sources of waste water can be admitted into the waste water aeration treatment tank system of the present invention utilizing the modified, open bottom stage reactors R of the present invention as shown in FIG. 25. Such other sources of waste water include swamps, ponds, lakes, marshes, streams, holding areas, etc., that contain unwanted waste matter therein such as polluted water, algae, and the like. With regard to the embodiments of reactors contained in FIGS. 1-21, the open bottom stage reactors R can be used therein such as in FIGS. 6, 8, 9, 11, 12, 14, 15, and 17 through 26.

The one or more modified stage reactors R or any new open bottom stage reactor having the same features and structure can be placed in a waste water aeration treatment tank 70 over the air diffusers thereof so that air from an air intake or input source 72, that extends outside of tank 70, is conveyed by air pipes 74 to numerous diffuser outlets 76 whereby they aerate the waste water. Since, of course, air bubbles are lighter than water, air bubbles as well as waste water is transferred up through reactor R is bio-remediated as noted herein above. Stage reactors R will bio-remediate the waste water, i.e. treat the same, so that a clean, clear aqueous product is produced. In order to aid in production of such clear, pure, water, other than disinfection as with chlorine, any general and practical flow scheme can be utilized. For example, with regard to the waste water aeration treatment tanks shown in FIG. 24, the waste water can be introduced into one end of the tank and withdrawn from the opposite end thereof such that a desired flow pattern with regard to bio-remediation of the waste water is achieved. Another advantage of the open bottom reactors of the present invention is that unexpected, greatly improved bio-remediation is achieved. Since the reactors of the present invention do not require any power, energy efficiency is also improved.

Such clean water has many non-drinking uses such as watering plants, shrubs, trees, and the like, watering grass, and filling ponds as wherein the water is used in an emergency as in case of fires. Another notable advantage of the present invention is that the treated water has an enormous, and significant increased amounts of microbes therein that are useful for the efficient treatment of polluted bodies of water. The bio-diversity of such microbes is also greatly increased. The existence of such microbes is very useful with regard to unexpected toxic events and greatly improve the chances of bio-remediating the same. Another dramatic improvement of the present invention is the large or greatly reduced amount of biosludge that generally has plagued municipal treatment plants heretofore in that the only elimination thereof was to dump the same in to a pit. The modified open bottom area stage reactors R of the present invention increased the efficiency of air produced so that less air is needed to be solubilized in the treated water.

Modified or New Open Bottom Area Tube Reactor

Figure 26A:
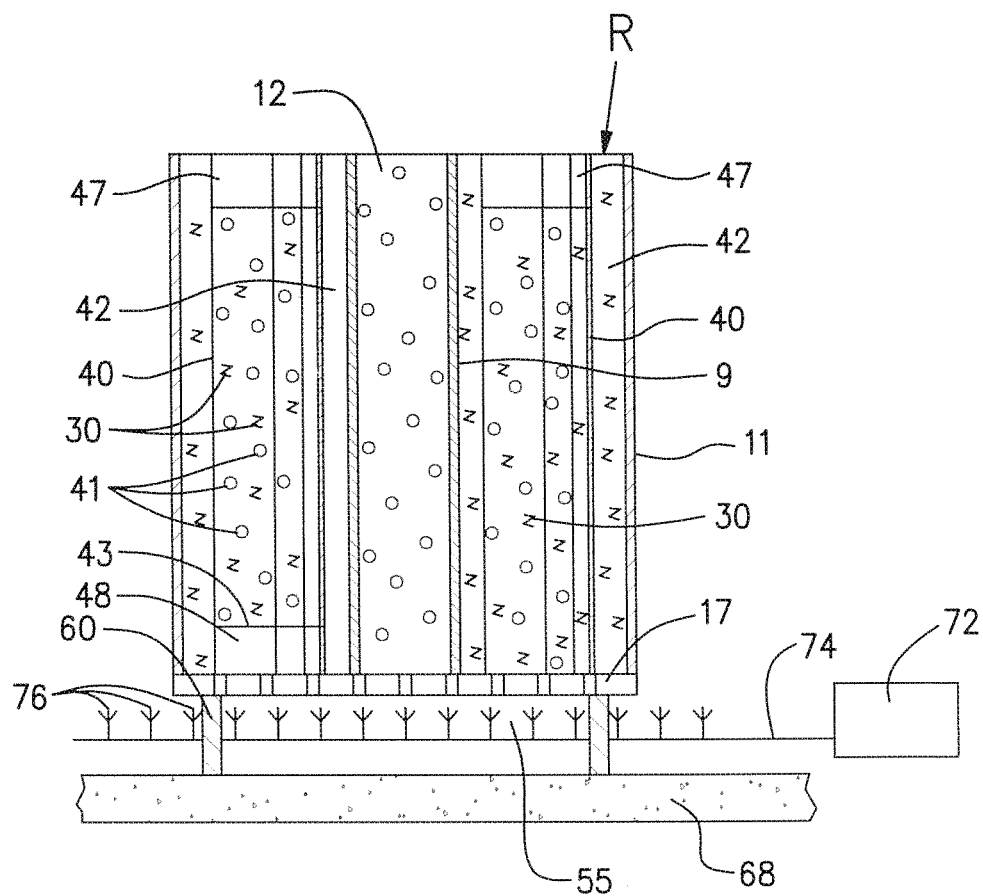
FIG. 26A relates to a modified or new, open bottom, tube reactor R of the present invention located in a commercial aerated waste water aeration treatment tank.

With regard to tube Reactor R of U.S. Pat. No. 9,162,909, hereby fully incorporated by reference, the embodiment of FIG. 22C that is a cross sectional view of the FIG. 22A tube reactor R, can be modified in a manner that is similar to the description of the modifications with regard to stage reactors R set forth in FIGS. 1, 5, 7, and FIG. 25, hereby fully incorporated by reference. Alternatively, it can be built from scratch to contain an open bottom area 55. Such a modified tube reactor is shown in FIG. 26A. One modification is the partial or the entire deletion of various bottom items such as reactor bottom plate 19 that is shown in FIG. 22C, so that waste water can fully enter the bottom of reactor R. In other words, the tube reactor R of FIG. 26A can be partially free of bottom plate 19 such as at least about 30% or at least about 50%, and desirably at least about 70% free based on the total area thereof and preferably totally (100%) free thereof, e.g. removed or eliminated. That is, the tube reactor of FIG. 26A can have no bottom plate. Another important aspect or modification is that an effective amount of the solid outer (side) wall 11 of the reactor R below microporous diffuser 16 is removed to provide a bottom open area so that adequate amounts of water can readily flow radially into the area beneath reactor R from the outside of the reactor. Generally, open bottom area 55 is at least about 30%, desirably at least about 50%, and preferably at least about 70% free, or totally free, no sidewall, e.g. removed or eliminated, of the radial circumference of the solid, bottom outer wall (side wall) area 11 of reactor R that is located below separator 17, except for any desirable portion that can serve as a support. Desirably, the entire bottom side wall 11 is removed and replaced by two or three or more supports such as legs, poles, bars, stanchions, 60, and the like. Tube reactor R is also at least partially free of, and preferably free of, i.e. removed or eliminated, any microporous air diffuser 16 and only contains a bottom separator 17 in lieu thereof to retain the packing substrates thereon. That is, said tube reactor can have no diffuser. As with the embodiment of FIG. 25, tube reactor R, of FIG. 26A is also partially free or preferably is totally free of, i.e. eliminated or removed, air or oxygen supply pipe or conduit 1 and 5 as well as air inlet pump 26 such as is utilized in FIGS. 22A-22D. That is, said tube reactor can have no air supply pipe or conduit 5. However, it is desirable that chimney 9 remains.

At least one perforated tube 40 contains one or more different types of packing substrates therein as set forth hereinabove and also in U.S. Pat. No. 9,162,909, hereby fully incorporated by reference. The amounts of the one or more different substrates that can be contained within tube, independently, is generally at least about 50%, desirably about at least 60% or at least about 70%, and preferably about 80% or about 90% by volume and preferably 100% by volume, based upon the total volume of any particular tube. Generally, a plurality of different packing substrates are utilized to treat different types of matter to be bio-remediated as for example, some substrates are better in treating acidic matter while other are better in treating basic, i.e. low pH matter, and so forth.

Figure 26B:
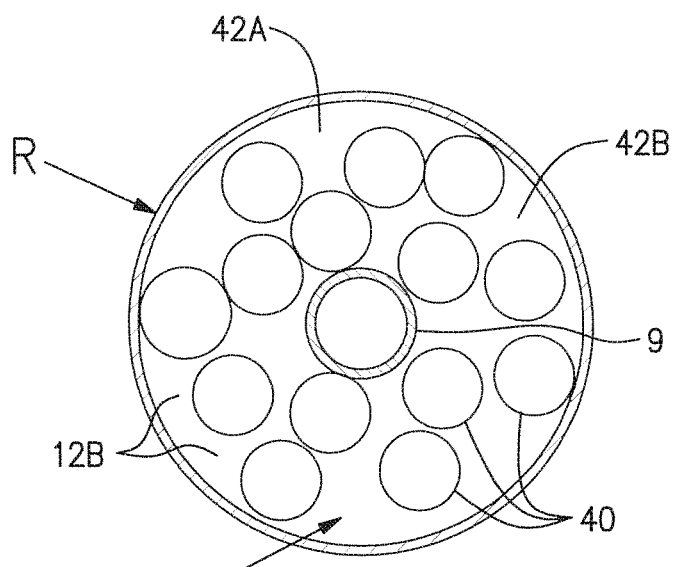
FIG. 26B relates to a top view as of a reactor of FIG. 26A showing a random arrangement of several tubes wherein only one closed non-tube area exists.

FIG. 26B is a top view of an open tube reactor such as shown in FIG. 26A showing a possible arrangement of several tubes that can be located within reactor R. Numerous different arrangements can exist. As noted immediately above, perforated tubes 40 can contain, independently, one or more different types of packing substrates therein. As readily apparent from FIG. 26B, any individual reactor tube 40 desirably contains packing substrates therein as noted above. The areas between the plurality of tubes as shown in FIG. 26B are referred to as non-tube areas. These areas are generally open, but can also be closed, that is being a format, pattern, design, that any packing substrate in such a non-tube area is confined therein. An "open" tube area refers to an area wherein any packing substrate is open to surrounding other tubes such as when reactor R is shaken before placement into a desired location so that, as for example, a fairly even level of packing substrates 30 can exist throughout a single particular tube.

According to the present invention, it is desired that one or more tubes 40 contain packing substrates therein, such as in the amounts noted above, and preferably that all such tubes contain packing substrates therein. With respect to the various non-tube areas, they can generally contain packing substrates therein such as in "enclosed" or "closed" non-tube areas 42A as well as in "open" non-tube areas 42B. Alternatively, it is desired that non-tube areas, i.e. both "closed" as well as "open" areas contain no packing substrates therein. The types of packing in the one or more non-tube areas, independently, can be chosen from the same packing substrate that can be used in tubes 40.

With regard to a reactor containing the above-noted one or more different types of packing substrates in the tubes, any "closed" non-tube area such as 42A, can have packing substrates therein with the remaining "open" non-tube reas 42B of reactor R having no packing substrates therein. Alternatively, the one or more "closed" non-tube areas 42A can have no packing substrates therein and the "open" non-tube areas 42B can have packing substrates therein. When packing is contained in one or more tubes 40, and also in any of the non-tube areas 42, a chimney is generally preferred. However, while being less efficient, no chimney need be used. In an embodiment wherein packing exists in one or more tubes 40 but does not exist in non-tube area 42, preferably no chimney is used. However, while not preferred, a chimney can be used in this embodiment.

The above modified tube reactors R of FIGS. 22A-22D or any new open bottom area tube reactor having the same features and structures can be used in any commercial waste water treatment system wherein they are placed over or above one or more air diffusers (aerators) 76 such as shown in FIG. 24. Thus, depending upon the waste water treatment system, one to about several, and even a 100 or more modified tube reactors can be utilized as in a very large waste treatment tank system as shown in FIG. 24. That is, FIG. 26A of the present invention relates to a tube-type reactor as described above, wherein the bottom side walls have been removed as well as bottom plate 19 and placed over a conventional air diffusion system. The modified or new tube reactor R is generally supported by legs 60 (or partial bottom side walls 11) that rest upon and contact the bottom 68, e.g. concrete, of waste water aeration treatment tank 70. In operation, tube reactor R is placed in waste water aeration treatment tank 70 that contains an air input source 72, an air pipe line 74 that feeds air, or oxygen, to diffusers 76 over which the modified tube reactor has been placed. The air input source 72 has an air intake pipe (not shown) that is located outside of tank 70. Thus, a bottom open area 55 exists wherein waste water from the conventional waste water aeration treatment tank can readily flow into and be bio-remediated by modified tube reactor R. Further modifications that tube reactor R of FIG. 26A are similar to that with regard to the stage reactor of FIG. 25 with respect to various portions of the tube reactor being removed such as various items or parts represented by numbers 1, 5, 16, 19, 43, 45, and 48. That is, one or more and desirably all of such components are not required by new or modified tube reactor R of FIGS. 26A and 26B.

With respect to the modified tube reactor R, as shown in FIG. 26A, advantages thereof as opposed to the reactors of FIGS. 22A through 22D include improved solubility of oxygen from air, improved through put of the waste water, improved energy savings, and improved economic benefits of the bio-remediation operation. The clean water produced by the modified or new tube reactor system as shown in FIG. 26A can be used for many applications as set forth hereinabove with respect to the new or modified stage reactor and hereby fully incorporated by reference including sludge reduction and bio-diversity of micropores.

High Flow Tube Reactor (HFTR)

Figure 28:
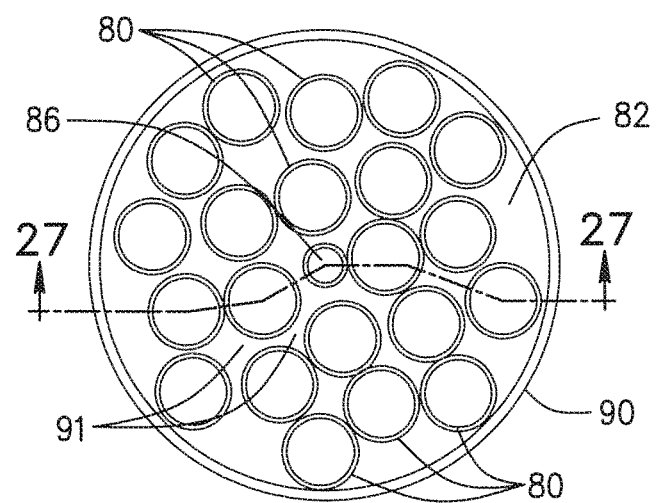
FIG. 28 is a top view of the reactor of FIG. 27.
Figure 27:
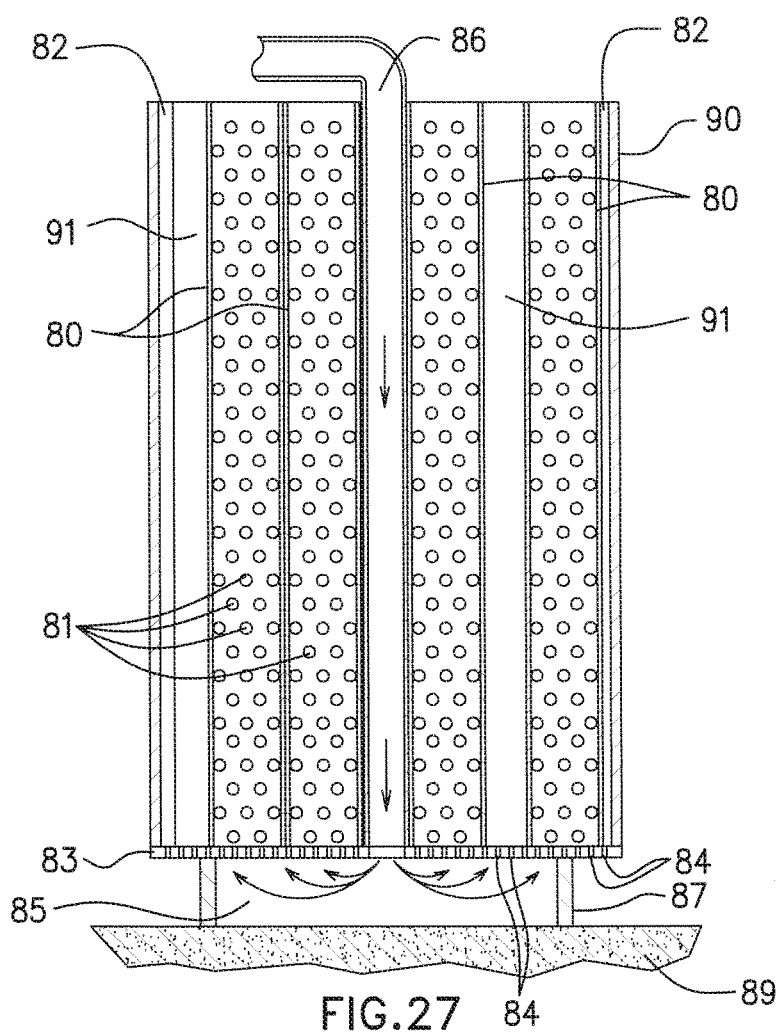
FIG. 27 relates to a high flow, open bottom, tube reactor of the present invention wherein no chimney exist and the non-tube areas are free of any packing substrates.

Another embodiment of the present invention relates to a new and improved tube reactor (HFTR) as shown in FIGS. 27 and 28. The HFTR can be utilized as a stand-alone unit in a waste water environment. That is, not in association with waste water aeration treatment tanks 70 containing air diffusers 76. The above description of the tube reactor shown in FIGS. 22A, 22B, 22C, as well as the modified tube reactor as shown in FIGS. 26A and 26B, is hereby fully incorporated by reference with regard to all aspects thereof except for any different structural description aspects set forth herein below.

The HFTR reactor outer wall 90 can generally have any cross-sectional shape such as square, rectangular, cylindrical, oval, and the like and preferably is oval or circular. The same is true with respect to the open bottom tube reactor, as with respect to FIGS. 26A and 26B. HFTR outer reactor wall 90 is solid and continuous, and is free of, that is does not have any perforations therein. The shell or outer wall 90 can be made out of various types of material such as ceramics, minerals, carbon substrates, metals, as set forth herein above and fully incorporated by reference, with polymers or plastics being preferred. Desired plastics include various types of polyethylene, polypropylene, polyester, with polyvinyl chloride (PVC) being preferred.

The HFTR contains a plurality of reactor tubes 80 therein that can be made of various plastics with polyethylene and/or polypropylene being preferred. Desirably, packing tubes 80 are located close to each other and often contact one another as shown in FIGS. 27 and 28 or a narrow open space 91 can exist between tubes 80. Tubes 80 have perforations 81 in the side wall portion thereof. The shape of the perforations can vary with circular or oval perforations being desired. The existence of the perforations permits an aqueous waste water composition and oxygen and/or air to flow therethrough and provides additional mixing of the air with tube packing substrates, not shown. The substrates generally exist throughout tubes 80, that is at least 50%, desirably at least 70%, and preferably at least 90% or most preferably 100% of the tube 80 volume and has one or more different types of packing substrates therein.

An important aspect of the invention is that non-tube areas 82 are free of any packing substrates meaning that at least about 70%, desirably at least about 80%, or 90%, and preferably 100%, i.e. the total non-tube volume area is free of, that is can have no packing substrates 30 therein.

An unexpected and synergistic result of the utilization of narrow or small non-tube areas 82 is that improved and sufficient flow of air and/or oxygen therethrough occurs resulting in improved bio-remediation. Thus, unexpectantly the improved flow has been found to eliminate the need for any chimney. In other words, the high flow tube reactor is free of and does not contain any chimneys therein.

The stand-alone HFTR of the present invention, when utilized in a conventional waste water environment, produces clean, clear water that has many advantages. The clean, clear produced water has a low biological oxygen demand (BOD) of less than about 50, desirably less than about 30, and preferably less than about 10 milligrams per liter. The total nitrogen content thereof is also low such as about 10, desirably less than about 5 and preferably less than about 1 milligram per liter. The total soluble solids (TSS) is also low such as about less than 100, desirably less than about 50, and preferably less than about 20 milligrams per liter.

Tube perforations 81 are of a size to allow air and/or oxygen to flow therethrough as well as waste water, but are small enough such that the one or more different types of packing substrates cannot flow therethrough. The packing substrates can be of any size, shape, and type, such as noted above, that aids in dissolving high amounts of oxygen into the waste water. The type of substrate material can be the same as set forth herein above, hereby fully incorporated by reference. The average packing substrate particle diameter of from about 0.3 to about 10 millimeters, and desirably from about 0.5 to about 6 millimeters. One or more different substrates can be utilized with a plurality of different packing substrates having different microorganisms therein being preferred because they abate different biological and environmental conditions, for example some microorganisms are more efficient in acidic environments whereas others are move effective in basic environments.

An important aspect of the HFTR invention in that the packing substrates have pores therein. The largest size of the pore can vary over a wide range such as from about at least 1 micron to about 150 microns or 250 microns, or up to 500 microns. Desirable pore sizes generally range from about 4, or about 20, or about 30, or about 50 microns to about 75 microns or 100 microns. The pores generally exist not only on the surface of substrate but also in the interior portion thereof and can extend entirely therethrough such that the substrate has an "open pore structure".

Another important aspect of the HFTR invention is that the packing substrates have a high surface area such as from about at least 100 square meters per cubic meter, ($M^2/S^3$) and desirably at least about 500 ($M^2/M^3$) to about 1,000 ($M^2/M^3$), and even 200,000 ($M^2/M^3$) wherein $M^2$ is a surface area and $M^3$ is the volume. A more desirable range is from about 500 ($M^2/M^3$) or 800 ($M^2/M^3$) to about 10,000 ($M^2/M^3$).

In order to effect bio-remediation of the waste water, the packing substrates contain one or more, desirably a plurality of different microorganisms that work through different mechanisms to achieve bio-remediation. Such mechanisms include eradication, reaction therewith, formation of complexes, splitting of molecules, formation of new compounds such as carbon oxide, water, sulfur dioxide, nitrites, nitrates, and nitrogen, and the like. Such microorganisms are generally cellular and able to replicate without a host cell. The different types of bacteria are numerous and known to the art and to the literature and include bacteria that biodegrade carbonaceous compounds such as various *pseudomonas* species, for example, *Pseudomonas vesicularis, Pseudomonas putida, Aeromonas hydrophila, Brevibacterium acetylicum*, bacteria to biodegrade nitrogen-containing compounds such as *Nitrobacter* species such as *Nitrobacter winogradskyi*, and *Nitrosomonas* species such as *Nitrosomonas europaea* and bacteria to biodegrade sulfur-containing compounds such as *Thiobacillus* species such as *Thiobacillus denitrificans* and the like. Other microorganisms include various fungi such as those that naturally exist in mushrooms, yeasts, and molds. Generally, they lack chlorophyll, have a cell wall composed of polysaccharides, sometimes polypeptides, and chitin, and reproduce either sexually or asexually. Protozoa are simple microorganisms consisting of unicellular organisms that range in size from sub-microscopic to macroscopic. Types of protozoa include sarcomastigophora, labyrinthomorpha, apicomplexa, microspora, acetospora, myxozoa, and ciliophora. Preferably at least two or three, and even four or more different types of microorganism exist within the same bio-remediation tubes 80 of the present invention inasmuch as they have been found to destroy, eradicate, eliminate, react with, the various carbonaceous compounds, various nitrogen containing compounds, various sulfur containing compounds, various toxic compounds, and the like.

The HFTR of the present invention contains bottom separator 83 that acts as a separator to maintain packing substrates thereabove and prevent the same from falling out of reactor 90. Thus, bottom separator 83 perforations 84 are of generally a size such that retain packing substrates therein but freely allow the aqueous waste as well as the air and/or oxygen to pass therethrough, into the bottom of tubes 80 and also into the non-tube areas 82. They generally have a very small size, i.e. microporous, to disperse oxygen from air into the reactor. The HFTR also contains an air and/or oxygen inlet pipe 86 that generally extends from the top of the reactor down through between various reactor tubes 80 and through bottom wall separator 83 into chamber 85 that is located beneath separator 83. The chamber contains various types of support such as one or more legs 87 that extend below separator 83. The HFTR has no bottom plate. The legs can be generally made out of any suitable material (e.g. stainless steel, various plastics, and other water-resistant materials) and extend at a plurality of positions located about the HFTR. Typically, and desirably, legs 87 can be an extension of the reactor vessel side walls 90. If the latter is utilized, openings, in the bottom of sidewall 90 located below bottom separator 83, not shown, exist within the side walls so that sufficient amounts of waste water can enter chamber 85 and be bio-remediated. Thus, the reactor has no waste water inlet pipe. The legs can reside on ground or a substrate 89 such as concrete. In chamber 85, air and/or oxygen from inlet pipe 86 is dispersed along the bottom of separator 83 whereby, being lighter than the waste water, it penetrates and rises through bottom perforations 84 of separator 83 and enters the bottom of tubes 80 and also through tube perforations 81 to supply needed oxygen from air to the micro-remediation organisms that are contained on and generally within the pores of the packing substrates. The packing substrates act as an impediment and thus slow the flow of oxygen contained in the air through the reactor thereby increasing the reaction time of the oxygen with the various one or more microorganisms. That is, on the average, the air at the top of the tower has a larger amount of oxygen reacted therein as opposed to other systems where the air can rapidly rise through the reactor. The result can be an enormous cost savings in energy in that smaller size pumps can be utilized as opposed to commercial existing waste water aeration treatment tanks 70 as commonly used in municipal sewage plants. Stated differently, much less air containing oxygen is required since the amount of dissolved oxygen within the reactor is increased so that larger or greater amounts of waste water or other biomass is treated by the various microorganisms.

Air through non-tube areas 82 also creates an updraft that increases mixing of the air and/or oxygen into packed tubes 80 and also eliminates the need for any chimney. That is, the HFTR, as noted and as shown in FIGS. 27 and 28, is free of any chimney and thus can have no chimney. As noted above, an unexpected improvement is obtained over the tube reactors of FIGS. 22 and 26 with respect to BOD, nitrogen content, and TSS.

In another embodiment, the open bottom stage reactor (FIG. 25), the open bottom tube reactor (FIGS. 26A and 26B), and the high flow tube reactor (FIGS. 27 and 28) can be supported by a tripod with the top of the tripod attached to the reactor. Other embodiments include four or more legs. In lieu of legs for support, open bottom stage reactors, the open bottom tube reactors, and the high flow open bottom reactors of the present invention can be suspended as by a wire, rope, etc., or supported by any conventional manner by a floatation device, in the body of waste water to be treated. In yet another embodiment, the high flow, open bottom, reactor can reside in a horizontal position within the waste water, in which can optionally a vertical chimney or a vertical spacer is utilized.

The HFTR desirably does not contain any bottom plate that is located beneath legs 87 of the reactor or along any bottom portion of the reactor shell 90 that serves as a bottom side wall. However, any such bottom side wall 90 is generally free of at least about 70%, desirably at least about 80%, preferably at least about 90%, and more preferably entirely free of, i.e. no bottom side wall 90. That is, the HFTR can have no bottom plate. The HFTR also is generally free of any waste water inlet pipe or like inasmuch as legs 87 are sufficiently spaced to allow a bio-degradable reacted amount of waste water to enter through the bottom of the HFTR. That is, the HFTR can have no waste water inlet pipe. The biological oxygen demand (BOD) of the effluent is less than about 30 ppm, less than about 20 ppm, less than about 10 ppm, or even less than about 5 ppm depending upon amount media or packing used.

While in accordance with the patent statutes, the best mode and preferred embodiment have been set forth, the scope of the invention is not limited thereto, but rather by the scope of the attached claims.

What is claimed is:

1. An apparatus for the bio-remediation of waste water, comprising:
   a solid side wall bio-remediation reactor having a plurality of bio-remediation stages therein, said stages separated by a perforated separator, said reactor having a bottom separator;
   said reactor having a plurality of porous packing substrates located in said bio-remediation stages and said substrates having one or more microorganisms attached thereto; said packing having micropores therein;
   at least one perforated chimney pipe located within said reactor;
   said reactor having an open bottom area located below said bottom separator; and said reactor having no air or oxygen, or both, inlet pipe, said stage reactor having one or more supports; and
   said reactor capable of being located in a waste water aeration treatment tank containing aerators and waste water therein.

2. The apparatus for the bio-remediation of waste water according to claim 1, wherein said open bottom area of said bio-remediation reactor has no diffuser.

3. The apparatus for the bio-remediation of waste water according to claim 2, wherein said reactor has no bottom plate; and wherein said support comprises one or more legs.

4. The apparatus for the bio-remediation of waste water according to claim 3, wherein said reactor is capable of residing on a substrate in a waste water environment, floating in a waste water environment, or being suspended in a waste water environment.

5. The apparatus for the bio-remediation of waste water according to claim 3, wherein said porous packing substrates comprise a mineral, a carbon substance, a ceramic, a metal, a polymer or a plastic, or any combination thereof; wherein said mineral substrate comprises diatomaceous earth, fuller's earth, titanium dioxide, zirconium dioxide, chromium oxide, zinc oxide, magnesia, boria, boron nitride, pumice, lava including crushed lava, celite, slag, or any combination thereof; wherein said carbon substrate comprises charcoal, coal, pyrolyze wood or wood chips, activated carbon, or any combination thereof; wherein said ceramic comprises silicate, alumina, mullite, brick, tile, terra cotta, porcelain, a glass such as sodium glass or boron glass, porcelain enamel, a refractory including alumina, silicon carbide, boron carbide, or any combination thereof; wherein said metal substrates comprise iron, nickel, cobalt, zinc, aluminum, or any combination thereof; and wherein said polymers and plastics comprise a homopolymer, a copolymer, or a graph copolymer, including polystyrene or copolymer of styrene and/or α-methyl styrene and acrylonitrile, a copolymer of styrene/acrylonitrile (SAN), a terpolymer of styrene, a copolymer of acrylonitrile and diene rubber (ABS), a copolymer of styrene/acrylonitrile modified with acrylate elastomer (ASA), a copolymer of styrene/acrylonitrile modified with ethylene/propylene/diene monomer (EPDM) rubber, and a copolymer of styrene and maleic anhydride (SMA), a polyolefin, polyethylene, polypropylene, chlorinated polyvinyl chloride (CPVC), polycarbonate (PC), thermoplastic aromatic polyester (TPES) including polybutylene terephthalate (PBT), polyethylene terephthalate (PET), polyether-ester segmented copolymer, polyurethane (PUR), miscible blends of polystyrene and polyphenylene oxide (PPO), polyacetal (POM), poly acrylic acid, polymethacrylic acid, acrylic ester, methacrylic ester, polyamide-imide, polyacrylonitrile, polyarylsulfone, polyester-carbonate, polyether-imide, polyether-ketone (PEK), polyether-ether-ketone (PEEK), polyalphaether ketone (PAEK), polyether sulfone, polyphenylene sulfide, polysulfone, polyethylene, mixture of polyethylene and polypropylene, nylon, anionic or cationic exchange resin; or any combination thereof; and wherein said microorganism comprises a bacteria, a fungi, or a protozoa, or any combination thereof.

6. The apparatus for the bio-remediation of waste water according to claim 5, wherein said average surface area of said porous packing substrates is from about 500 to about 10,000 $M^2/M^3$, and wherein said average pore size of said porous packing substrates is from about 20 to about 100 microns.

7. The apparatus for the bio-remediation of waste water according to claim 6, wherein said one or more porous packing substrates comprises diatomaceous earth, lava including crushed lava, ceramic, microporous polystyrene, microporous polyethylene, microporous polypropylene, or any combination thereof; and wherein said microorganism comprises a *pseudomonas* species comprising *Pseudomonas vesicularis, Pseudomonas putida, Aeromonas hydrophila, Brevibacterium acetylicum*; a *Nitrobacter* species comprising *Nitrobacter winogradskyi*; a *Nitrosomonas* species comprising *Nitrosomonas europaea*; a sulfur containing compound comprising a *Thiobacillus* species or a *Thiobacillus denitrificans*; a fungi that naturally exists in mushrooms, yeasts, and molds; or a protozoa comprising sarcomastigophora, labyrinthomorpha, apicomplexa, microspora, acetospora, myxozoa, and ciliophora; or any combination thereof.

8. The apparatus for the bio-remediation of waste water according to claim 1, wherein the average surface area of said plurality porous packing substrates is from about 100 to about 200,000 square meters per cubic meter, and wherein said porous packing substrates have an average pore size of from about 1 micron to about 500 microns.

9. An apparatus for the bio-remediation of waste water, comprising:
    a solid side wall bio-remediation tube reactor having one or more side wall perforated bio-remediation tubes therein, at least one of said perforated bio-remediation tubes, independently, having therein one or more different types of packing substrates that are retained therein, said packing substrates being porous and having micro-pores therein;
    said bio-remediation tube reactor having a non-tube reactor area, at least a portion of said non-tube area having one or more different types of packing substrate therein, said packing substrates being porous and having micro-pores therein;
    said tube reactor having multiple types of different microorganisms therein that are attached to said tube packing substrates, and to said non-tube area packing substrates;
    said tube reactor having a bottom separator for maintaining said packing substrates in said reactor;
    said tube reactor having at least one perforated chimney pipe;
    said tube reactor having an open bottom area located below said reactor bottom separator, said reactor having no air or oxygen, or both, inlet pipe, said reactor having one or more supports; and
    at least one or more of said tube reactors capable of being located in a waste water aeration treatment tank containing waste water therein.

10. The apparatus for the bio-remediation of waste water according to claim 9, wherein said tube reactor has no bottom plate, and wherein said support comprises one or more legs.

11. The apparatus for the bio-remediation of waste water according to claim 10, wherein the average surface area of said porous packing substrates is from about 100 to about 200,000 square meters per cubic meter, and wherein said porous packing substrates have an average pore size of from about 1 micron to about 500 microns.

12. The apparatus for the bio-remediation of waste water according to claim 11, wherein said average surface area of said porous substrates is from about 500 to about 10,000 $M^2/M^3$, wherein said average pore size of said porous packing substrates is from about 20 to about 100 microns, and wherein said open bottom area has no diffuser.

13. The apparatus for the bio-remediation of waste water according to claim 11, wherein said porous packing substrates comprise a mineral, a carbon substance, a ceramic, a metal, a polymer or a plastic, or any combination thereof; wherein said mineral substrate comprises diatomaceous earth, futler's earth, titanium dioxide, zirconium dioxide, chromium oxide, zinc oxide, magnesia, boria, boron nitride, pumice, lava including crushed lava, celite, slag, or any combination thereof; wherein said carbon substrate comprises charcoal, coal, pyrolyze wood or wood chips, activated carbon, or any combination thereof; wherein said ceramic comprises silicate, alumina, mullite, brick, tile, terra cotta, porcelain, a glass such as sodium glass or boron glass, porcelain enamel, a refractory including alumina, silicon carbide, boron carbide, or any combination thereof; wherein said metal substrates comprise iron, nickel, cobalt, zinc, aluminum, or any combination thereof; and wherein said polymers and plastics comprise a homopolymer, a copolymer, or a graph copolymer, including polystyrene or copolymer of styrene and/or α-methyl styrene and acrylonitrile, a copolymer of styrene/acrylonitrile (SAN), a terpolymer of styrene, a copolymer of acrylonitrile and diene rubber (ABS), a copolymer of styrene/acrylonitrile modified with acrylate elastomer (ASA), a copolymer of styrene/acrylonitrile modified with ethylene/propylene/diene monomer (EPDM) rubber, and a copolymer of styrene and maleic anhydride (SMA), a polyolefin, polyethylene, polypropylene, chlorinated polyvinyl chloride (CPVC), polycarbonate (PC), thermoplastic aromatic polyester (TPES) including polybutylene terephthalate (PBT), polyethylene terephthalate (PET), polyether-ester segmented copolymer, polyurethane (PUR), miscible blends of polystyrene and polyphenylene oxide (PPO), polyacetal (POM), poly acrylic acid, polymethacrylic acid, acrylic ester, methacrylic ester, polyamide-imide, polyacrylonitrile, polyarylsulfone, polyester-carbonate, polyether-imide, polyether-ketone (PEK), polyether-ether-ketone (PEEK), polyalphaether ketone (PAEK), polyether sulfone, polyphenylene sulfide, polysulfone, polyethylene, mixture of polyethylene and polypropylene, or nylon, anionic or cationic exchange resin, or any combination thereof; wherein said one or more porous packing substrates comprise diatomaceous earth, lava including crushed lava, ceramic, microporous polystyrene, microporous polyethylene, microporous polypropylene, or any combination thereof; and wherein said microorganism comprises a *pseudomonas* species comprising *Pseudomonas vesicularis, Pseudomonas putida, Aeromonas hydrophila, Brevibacterium acetylicum*; a *Nitrobacter* species comprising *Nitrobacter winogradskyi*; a *Nitrosomonas* species comprising *Nitrosomonas europaea*; a sulfur containing compound comprising *Thiobacillus* species or *Thiobacillus*

*denitrificans*; a fungi that naturally exists in mushrooms, yeasts, and molds; or a protozoa comprising sarcomastigophora, labyrinthomorpha, apicomplexa, microspore, acetospora, myxozoa, and ciliophora; or any combination thereof.

14. The apparatus for the bio-remediation of waste water according to claim 9, wherein said tube reactor has no chimney pipe.

15. An apparatus for the bio-remediation of waste water, comprising:
 a solid side wall bio-remediation tube reactor having one or more side wall perforated bio-remediation tubes therein, at least one of said perforated bio-remediation tubes, independently, having therein one or more different types of packing substrates that are retained therein, said packing substrates being porous and having micro-pores therein;
 said bio-remediation tube having a non-tube reactor area, wherein said non-tube reactor area has no packing substrates therein;
 said tube reactor having multiple types of different microorganisms therein that are attached to said packing substrates;
 said tube reactor having a bottom separator for maintaining said packing substrates in said reactor;
 said tube reactor having no chimney pipe;
 said tube reactor having an open bottom area located below said reactor bottom separator, said reactor having no air or oxygen, or both, inlet pipe, said reactor having one or more supports; and
 at least one or more of said tube reactors capable of being located in a waste water aeration treatment tank containing waste water therein.

16. An apparatus for the bio-remediation of waste water according to claim 15, wherein said tube reactor has no bottom plate, and wherein said support comprises one or more legs.

17. An apparatus for the bio-remediation of waste water according to claim 16, wherein the average surface area of said porous packing substrates is from about 100 to about 200,000 square meters per cubic meter, and wherein said porous packing substrates have an average pore size of from about 1 micron to about 500 microns.

18. An apparatus for the bio-remediation of waste water according to claim 17, wherein said average surface area of said porous substrates is from about 500 to about 10,000 $M^2/M^3$, wherein said average pore size of said porous packing substrates is from about 20 to about 100 microns, and wherein said open bottom areas has no diffuser.

19. An apparatus for the bio-remediation of waste water according to claim 16, wherein said porous packing substrates comprise a mineral, a carbon substance, a ceramic, a metal, a polymer or a plastic, or any combination thereof; wherein said mineral substrate comprises diatomaceous earth, fuller's earth, titanium dioxide, zirconium dioxide, chromium oxide, zinc oxide, magnesia, boria, boron nitride, pumice, lava including crushed lava, celite, slag, or any combination thereof; wherein said carbon substrate comprises charcoal, coal, pyrolyze wood or wood chips, activated carbon, or any combination thereof; wherein said ceramic comprises silicate, alumina, mullite, brick, tile, terra cotta, porcelain, a glass such as sodium glass or boron glass, porcelain enamel, a refractory including alumina, silicon carbide, boron carbide, or any combination thereof; wherein said metal substrates comprise iron, nickel, cobalt, zinc, aluminum, or any combination thereof; and wherein said polymers and plastics comprise a homopolymer, a copolymer, or a graph copolymer, including polystyrene or copolymer of styrene and/or α-methyl styrene and acrylonitrile, a copolymer of styrene/acrylonitrile (SAN), a terpolymer of styrene, a copolymer of acrylonitrile and diene rubber (ABS), a copolymer of styrene/acrylonitrile modified with acrylate elastomer (ASA), a copolymer of styrene/acrylonitrile modified with ethylene/propylene/diene monomer (EPDM) rubber, and a copolymer of styrene and maleic anhydride (SMA), a polyolefin, polyethylene, polypropylene, chlorinated polyvinyl chloride (CPVC), polycarbonate (PC), thermoplastic aromatic polyester (TPES) including polybutylene terephthalate (PBT), polyethylene terephthalate (PET), polyether-ester segmented copolymer, polyurethane (PUR), miscible blends of polystyrene and polyphenylene oxide (PPO), polyacetal (POM), poly acrylic acid, polymethacrylic acid, acrylic ester, methacrylic ester, polyamide-imide, polyacrylonitrile, polyarylsufone, polyestercarbonate, polyether-imide, polyether-ketone (PEK), polyether-ether-ketone (PEEK), polyalphaether ketone (PAEK), polyether sulfone, polyphenylene sulfide, polysulfone, polyethylene, mixture of polyethylene and polypropylene, or nylon, anionic or cationic exchange resin, or any combination thereof; wherein said one or more porous packing substrates comprise diatomaceous earth, lava including crushed lava, ceramic, microporous polystyrene, microporous polyethylene, microporous polypropylene, or any combination thereof; and wherein said microorganism comprises a *pseudomonas* species comprising *Pseudomonas vesicularis, Pseudomonas putida, Aeromonas hydrophila, Brevibacterium acetylicum*; a *Nitrobacter* species comprising *Nitrobacter winogradskyi*; a *Nitrosomonas* species comprising *Nitrosomonas europaea*; a sulfur containing compound comprising *Thiobacillus* species or *Thiobacillus denitrificans*; a fungi that naturally exists in mushrooms, yeasts, and molds; or a protozoa comprising sarcomastigophora, labyrinthomorpha, apicomplexa, microspore, acetospora, myxozoa, and ciliophora; or any combination thereof.

20. An apparatus for the bio-remediation of waste water according to claim 15, wherein said bio-remediation tube reactor does have a chimney therein.

21. An apparatus for the bio-remediation of waste water, comprising:
 a solid side wall bio-remediation tube reactor having one or more side wall perforated bio-remediation tubes therein, at least one of said perforated bio-remediation tubes, independently, having therein one or more different types of packing substrates that are retained therein, said substrates being porous and have micropores therein;
 said bio-remediation tube reactor having a non-tube reactor area, said non-tube area being at least 70% by volume free of any packing substrates therein;
 said tube reactor having one or more different microorganisms therein that are attached to said tube packing substrates;
 said tube reactor having no chimney;
 said tube reactor having a bottom separator for maintaining said tube packing substrates in said perforated bio-remediation tubes;
 said reactor having an open bottom area located below said bottom separator; and
 said tube reactor having an air and/or oxygen inlet capable of admitting air and/or oxygen to said reactor.

22. An apparatus for the bio-remediation of waste water according to claim 21, wherein said non-tube area is at least 80% by volume free of any packing substrates therein.

23. An apparatus for the bio-remediation of waste water according to claim 22, wherein said tube reactor has no bottom plate, and wherein said tube reactor has one or more supports.

24. An apparatus for the bio-remediation of waste water according to claim 23, wherein said support is one or more legs that extend below said separator, and wherein said non-tube area is at least 90% by volume free of any packing substrates.

25. The apparatus for the bio-remediation of waste water according to claim 23, wherein said reactor has a bottom chamber located below said separator and wherein said air and/or oxygen is dispersed into said chamber, and wherein said non-tube area has no packing substrates therein.

26. The apparatus for the bio-remediation of waste water according to claim 25, wherein said average surface area of said porous substrates is from about 500 to about 10,000 $M^2/M^3$, and wherein said average pore size of said porous packing substrates is from about 20 to about 100 microns.

27. The apparatus for the bio-remediation of waste water according to claim 26, wherein said one or more porous packing substrates comprise diatomaceous earth, lava including crushed lava, ceramic, microporous polystyrene, microporous polyethylene, microporous polypropylene, or any combination thereof; and wherein said microorganism comprises a *pseudomonas* species comprising *Pseudomonas vesicularis, Pseudomonas putida, Aeromonas hydrophila, Brevibacterium acetylicum*; a *Nitrobacter* species comprising *Nitrobacter winogradskyi*; a *Nitrosomonas* species comprising *Nitrosomonas europaea*; a sulfur containing compound comprising *Thiobacillus* species or *Thiobacillus denitrificans*; a fungi that naturally exists in mushrooms, yeasts, and molds; or a protozoa comprising sarcomastigophora, labyrinthomorpha, apicomplexa, microspore, acetospora, myxozoa, and ciliophora; or any combination thereof.

28. The apparatus for the bio-remediation of waste water according to claim 25, wherein said microorganism comprises a *pseudomonas* species comprising *Pseudomonas vesicularis, Pseudomonas putida, Aeromonas hydrophila, Brevibacterium acetylicum*; a *Nitrobacter* species comprising *Nitrobacter winogradskyi*; a *Nitrosomonas* species comprising *Nitrosomonas europaea*; a sulfur containing compound comprising *Thiobacillus* species or *Thiobacillus denitrificans*; a fungi that naturally exists in mushrooms, yeasts, and molds; or a protozoa comprising sarcomastigophora, labyrinthomorpha, apicomplexa, microspore, acetospora, myxozoa, and ciliophora; or any combination thereof, and wherein said porous packing substrates comprise a mineral, a carbon substance, a ceramic, a metal, a polymer or a plastic, or any combination thereof; wherein said mineral substrate comprises diatomaceous earth, fuller's earth, titanium dioxide, zirconium dioxide, chromium oxide, zinc oxide, magnesia, boria, boron nitride, pumice, lava including crushed lava, celite, slag, or any combination thereof; wherein said carbon substrate comprises charcoal, coal, pyrolyze wood or wood chips, activated carbon, or any combination thereof; wherein said ceramic comprises silicate, alumina, mullite, brick, tile, terra cotta, porcelain, a glass such as sodium glass or boron glass, porcelain enamel, a refractory including alumina, silicon carbide, boron carbide, or any combination thereof; wherein said metal substrates comprise iron, nickel, cobalt, zinc, aluminum, or any combination thereof; and wherein said polymers and plastics comprise a homopolymer, a copolymer, or a graph copolymer, including polystyrene or copolymer of styrene and/or α-methyl styrene and acrylonitrile, a copolymer of styrene/acrylonitrile (SAN), a terpolymer of styrene, a copolymer of acrylonitrile and diene rubber (ABS), a copolymer of styrene/acrylonitrile modified with acrylate elastomer (ASA), a copolymer of styrene/acrylonitrile modified with ethylene/propylene/diene monomer (EPDM) rubber, and a copolymer of styrene and maleic anhydride (SMA), a polyolefin, polyethylene, polypropylene, chlorinated polyvinyl chloride (CPVC), polycarbonate (PC), thermoplastic aromatic polyester (TPES) including polybutylene terephthalate (PBT), polyethylene terephthalate (PET), polyether-ester segmented copolymer, polyurethane (PUR), miscible blends of polystyrene and polyphenylene oxide (PPO), polyacetal (POM), poly acrylic acid, polymethacrylic acid, acrylic ester, methacrylic ester, polyamide-imide, polyacrylonitrile, polyarylsulfone, polyester-carbonate, polyether-imide, polyether-ketone (PEK), polyether-ether-ketone (PEEK), polyalphaether ketone (PAEK), polyether sulfone, polyphenylene sulfide, polysulfone, polyethylene, mixture of polyethylene and polypropylene, nylon, anionic or cationic exchange resin; or any combination thereof.

29. The apparatus for the bio-remediation of waste water according to claim 25, wherein said microorganism comprises a *pseudomonas* species comprising *Pseudomonas vesicularis, Pseudomonas putida, Aeromonas hydrophila, Brevibacterium acetylicum*; a *Nitrobacter* species comprising *Nitrobacter winogradskyi*; a *Nitrosomonas* species comprising *Nitrosomonas europaea*; a sulfur containing compound comprising *Thiobacillus* species or *Thiobacillus denitrificans*; a fungi that naturally exists in mushrooms, yeasts, and molds; or a protozoa comprising sarcomastigophora, labyrinthomorpha, apicomplexa, microspore, acetospora, myxozoa, and ciliophora; or any combination thereof.

30. The apparatus for the bio-remediation of waste water according to claim 22, wherein said air and/or oxygen inlet pipe extends below said separator and is capable of admitting said air and/or oxygen therein, and wherein said tube reactor has at least one chimney therein.

31. The apparatus for the bio-remediation of waste water according to claim 21, wherein the average surface area of said porous packing substrates is from about 100 to about 200,000 square meters per cubic meter and wherein said porous packing substrates have an average pore size of from about 1 micron to about 500 microns.

32. An apparatus for the bio-remediation of waste water according to claim 21, wherein said one or more non-tube areas are free of any packing substrates therein.

33. The apparatus for the bio-remediation of waste water according to claim 32, wherein wherein said air and/or oxygen inlet pipe extends below said separator and is capable of admitting said air and/or oxygen therein.

34. The apparatus for the bio-remediation of waste water according to claim 33, wherein the average surface area of said porous packing substrates is from about 100 to about 200,000 square meters per cubic meter and wherein said porous packing substrates have an average pore size of from about 1 micron to about 500 microns.

35. The apparatus for the bio-remediation of waste water according to claim 34, wherein said average surface area of said porous substrates is from about 500 to about 10,000 $M^2/M^3$, and wherein said average pore size of said porous packing substrates is from about 20 to about 100 microns.

36. The apparatus for the bio-remediation of waste water according to claim 34, wherein said microorganism comprises a *pseudomonas* species comprising *Pseudomonas vesicularis, Pseudomonas putida, Aeromonas hydrophila, Brevibacterium acetylicum*; a *Nitrobacter* species comprising *Nitrobacter winogradskyi*; a *Nitrosomonas* species comprising *Nitrosomonas europaea*; a sulfur containing compound comprising *Thiobacillus* species or *Thiobacillus denitrificans*; a fungi that naturally exists in mushrooms, yeasts, and molds; or a protozoa comprising sarcomastigophora, labyrinthomorpha, apicomplexa, microspore, acetospora, myxozoa, and ciliophora; or any combination thereof.

37. The apparatus for the bio-remediation of waste water according to claim 36, wherein said one or more porous packing substrates comprise diatomaceous earth, lava including crushed lava, ceramic, polystyrene, polyethylene, polyvinyl chloride, chlorinated polyvinyl chloride, polyester, nylon, or any combinations thereof.

* * * * *